US010931660B2

(12) United States Patent
Marinho et al.

(10) Patent No.: US 10,931,660 B2
(45) Date of Patent: Feb. 23, 2021

(54) CYBER SECURITY-BASED CERTIFICATION OF IOT DEVICES

(71) Applicant: CTIA—The Wireless Association, Washington, DC (US)

(72) Inventors: John A. Marinho, Vienna, VA (US); Robert Peter Cantu, II, Washington, DC (US)

(73) Assignee: CTIA—The Wireless Association, Washington, DC (US)

(*) Notice: Subject to any disclaimer, the term of this patent is extended or adjusted under 35 U.S.C. 154(b) by 196 days.

(21) Appl. No.: 16/268,565

(22) Filed: Feb. 6, 2019

(65) Prior Publication Data
US 2019/0245845 A1 Aug. 8, 2019

Related U.S. Application Data
(60) Provisional application No. 62/626,997, filed on Feb. 6, 2018.

(51) Int. Cl.
H04W 12/08 (2009.01)
H04W 12/02 (2009.01)
(Continued)

(52) U.S. Cl.
CPC ...... H04L 63/0823 (2013.01); H04L 63/0227 (2013.01); H04L 63/0428 (2013.01); H04L 63/102 (2013.01); H04L 63/1408 (2013.01); H04L 63/1433 (2013.01); H04W 12/08 (2013.01); H04L 2463/082 (2013.01)

(58) Field of Classification Search
None
See application file for complete search history.

(56) References Cited

U.S. PATENT DOCUMENTS 9,332,290 B2  5/2016 Amidei et al.
2010/0223672 A1  9/2010 Maher et al.
(Continued)

FOREIGN PATENT DOCUMENTS

WO  WO-2019040651 A1 * 2/2019 ........ H04W 12/0609

OTHER PUBLICATIONS

A systemic approach for IoT security. Riahi. IEEE. (Year: 2013).*
(Continued)

Primary Examiner — Venkat Perungavoor
(74) Attorney, Agent, or Firm — Fitch, Even, Tabin & Flannery LLP

(57) ABSTRACT

An IoT device testing platform is used to test a candidate IoT device with respect to a first plurality of cyber security criteria. A first certificate is granted for the device upon favorably passing that assessment with respect to the first plurality of cyber security criteria. Subsequent to granting that first certificate, the device is assessed with respect to a second plurality of cyber security criteria and a second certificate is granted when the device favorably passes that assessment. And then, subsequent to granting that second certificate, these teachings then provide for using the IoT device testing platform to test the candidate IoT device with respect to a third plurality of cyber security criteria and granting a third certificate for the candidate IoT device when the candidate IoT device favorably passes assessment with respect to the third plurality of cyber security criteria.

16 Claims, 20 Drawing Sheets

(51) Int. Cl.
  *H04L 29/06* (2006.01)
  *H04L 7/10* (2006.01)
  *H04W 88/04* (2009.01)

(56) References Cited

U.S. PATENT DOCUMENTS

| | | |
|---|---|---|
| 2012/0311686 A1 | 12/2012 | Medina et al. |
| 2016/0149917 A1* | 5/2016 | Matthieu ............... H04L 63/102 726/4 |
| 2017/0034700 A1* | 2/2017 | Cohen ................. H04W 12/003 |
| 2017/0041388 A1* | 2/2017 | Tal ......................... G06Q 10/10 |
| 2017/0201385 A1* | 7/2017 | Kravitz ................ H04L 9/0825 |
| 2017/0346848 A1 | 11/2017 | Smith et al. |
| 2018/0006829 A1* | 1/2018 | Kravitz .............. H04L 63/0823 |
| 2018/0019993 A1* | 1/2018 | Kravitz ................ H04L 9/0836 |
| 2019/0026458 A1* | 1/2019 | Choules ................. H04L 9/321 |
| 2019/0104119 A1* | 4/2019 | Giorgi .................. H04L 9/3226 |
| 2019/0312778 A1* | 10/2019 | Netanel ............... H04L 41/0823 |
| 2019/0335333 A1* | 10/2019 | Sohail ................ H04L 63/0823 |
| 2020/0235939 A1* | 7/2020 | Obaidi .................. H04L 9/3242 |

OTHER PUBLICATIONS

Enhancing the security of the IoT LoraWAN architecture. Naoui. IEEE. (Year: 2016).*
Emerging Security Threats and Countermeasures in IoT. Zhang. ACM. (Year: 2015).*
Software Security Considerations for IoT. Koivu. IEEE. (Year: 2016).*
A Mechanism for Securing IoT-enabled Applications at the Fog Layer. Abbas. JSAN. (Year: 2019).*
PCT Patent Application No. PCT/US19/16858—International Search Report and Written Opinion dated Apr. 23, 2019, 13 pages.

* cited by examiner

CYBER SECURITY-BASED CERTIFICATION OF IOT DEVICES

RELATED APPLICATION(S)

This application claims the benefit of U.S. Provisional application No. 62/626,997, filed Feb. 6, 2018, which is incorporated by reference in its entirety herein.

TECHNICAL FIELD

These teachings relate generally to the Internet-of-Things.

BACKGROUND

The Internet comprises a global system of interconnected computer networks that use the Internet protocol suite (TCP/IP) to link devices worldwide. Both wireless and non-wireless devices can compatibly utilize the modern Internet. The Internet-of-Things (IoT), in turn, is an expression that refers to the network of devices (beyond dedicated computers, smartphones, and the like) that contain electronics, software, actuators, and connectivity that allows these things to connect, interact, and exchange data via the Internet. There are essentially no categorical limits to the intended functionality of such devices. Examples include but are not limited to sensors, medical devices, consumer appliances and objects, vehicles, agricultural items, commercial and industrial items, and so forth.

The Internet-of-Things is growing quickly. As of 2018 it has been reported that the number of such devices exceeds twenty-three billion and the trend strongly suggests that additional devices will continue to be added. Along with widespread acceptance and proliferation, however, comes a number of concerns. There are concerns regarding, for example, privacy, security, obsolescence, and interoperability, to note but a few.

Certification or the like often serves to provide users with a way to understand if a given product meets certain requirements or specifications. The virtually unlimited scope of IoT platforms, functionality, and capabilities, however, presents great challenges to any certification approaches. To put it simply, what might be good and appropriate for one device may be quite inadequate or, conversely, excessive for another device.

BRIEF DESCRIPTION OF THE DRAWINGS

The above needs are at least partially met through provision of the cyber security-based certification of IoT devices described in the following detailed description, particularly when studied in conjunction with the drawings, wherein.

Figure 1:
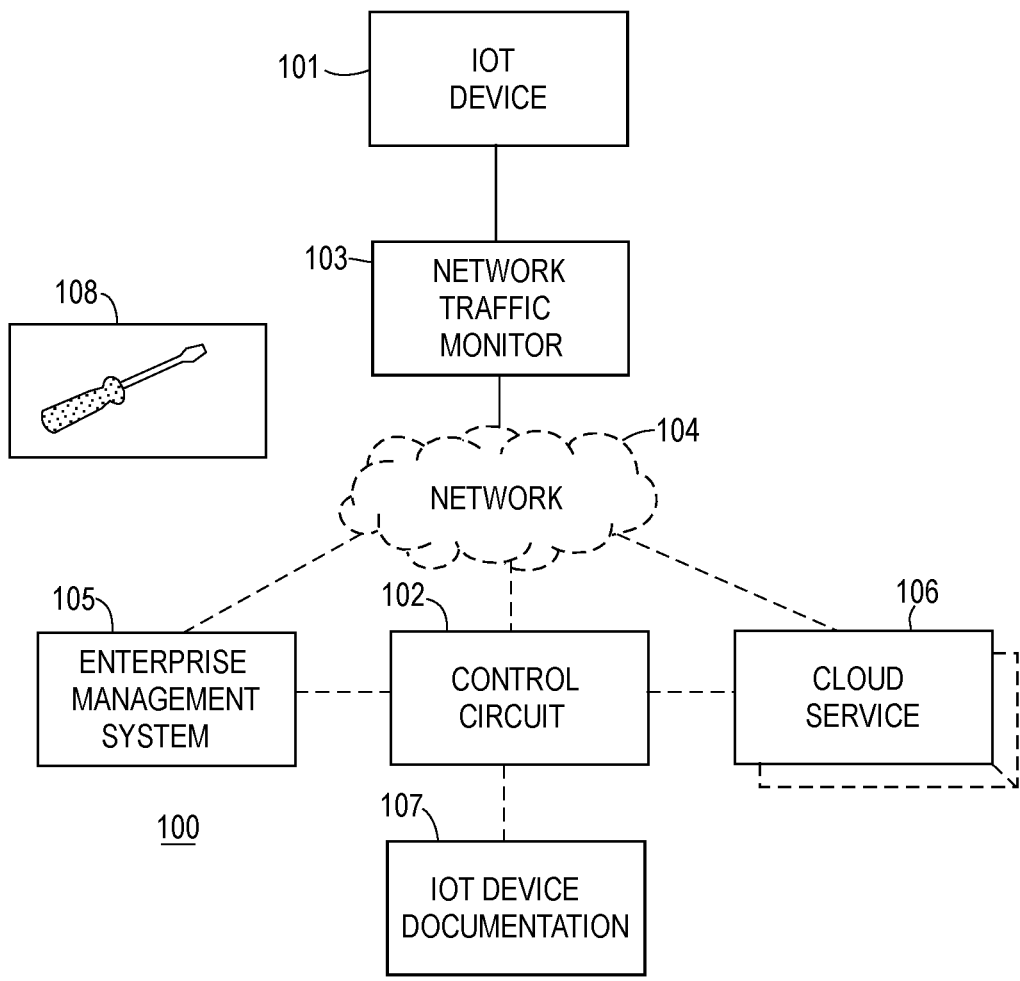
FIG. 1 comprises a block diagram as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated.

DETAILED DESCRIPTION

Generally speaking, pursuant to these various embodiments an IoT device testing platform (comprising at least in part a network traffic monitor and an enterprise management system) is utilized to assess a candidate IoT device with respect to three different pluralities of cyber security criteria. By one approach these teachings provide for granting a corresponding certificate upon passing each assessment of the candidate IoT device per each of the three different pluralities of cyber security criteria. (The "certificate" may be in hard copy format and/or a soft virtual format as desired.)

More particularly, these teachings provide for using the IoT device testing platform to test the candidate IoT device with respect to a first plurality of cyber security criteria and granting a first certificate for the candidate IoT device when the candidate IoT device favorably passes assessment with respect to the first plurality of cyber security criteria. Subsequent to granting that first certificate, these teachings then provide for using the IoT device testing platform to test the candidate IoT device with respect to a second plurality of cyber security criteria and granting a second certificate for the candidate IoT device when the candidate IoT device favorably passes assessment with respect to the second plurality of cyber security criteria. And then, subsequent to granting that second certificate, these teachings then provide for using the IoT device testing platform to test the candidate IoT device with respect to a third plurality of cyber secure area and granting a third certificate for the candidate IoT device when the candidate IoT device favorably passes assessment with respect to the third plurality of cyber security criteria.

By one approach, the first plurality of cyber security criteria will include criteria specifying contents of official documentation for the candidate IoT device (such as documentation provided by the manufacturer, distributor, or other vendor of the device). Examples in these regards include, but are not limited to, content in the documentation comprising terms of service and/or a privacy policy that apply to the candidate IoT device.

By one approach, the first plurality of cyber security criteria can further include criteria that specifies specific password management requirements, specific user authentication requirements, specific patch management requirements, and/or specific software upgrade management requirements. Other categorical areas of interest can be included if desired.

By one approach the second plurality of cyber security criteria will include criteria directed to cyber security performance when the candidate IoT device operates in a managed network. (By one approach the first plurality of cyber security criteria includes (partially or exclusively) criteria that is neutral or agnostic as regards operating in a managed network.) For example, such criteria can include at least one criterion that specifies specific password management requirements that pertain to operating in a managed network (and that is not included in the first plurality of cyber security criteria).

By one approach the second quality of cyber security criteria can include categorical assessment criteria that are not addressed in the first plurality of cyber security criteria. For example, the second plurality of cyber security criteria can include categorical assessment criteria regarding audit log performance, multi-factor authentication, and remote deactivation. Other examples include, but are not limited to, assessment criteria for secure boot performance, threat monitoring, digital signature handling, and device identifier handling.

By one approach the third plurality of cyber security criteria can include criteria specifying specific password management requirements that are not included in either of the first plurality of cyber security criteria or the second plurality of cyber security criteria. The third plurality of cyber security criteria can further include criteria that specifies specific patch management requirements and/or specific software upgrade requirements that are not included in either of the first or second plurality of cyber security criteria.

In addition, if desired, the third plurality of cyber security criteria can include additional categorical assessment criteria that are not addressed in either of the first or second plurality of cyber security criteria. Examples include, but are not limited to, at least one assessment criterion for encryption at rest capabilities and/or where the latter criterion may include, for example, at least one assessment criterion for tamper resistance (where the latter may include a requirement regarding the behavior of the candidate IoT device upon physically opening the housing of the candidate IoT device).

So configured, a wide variety of IoT devices, ranging from very simple to very complex and sophisticated devices, can be readily, objectively, fairly, and appropriately assessed with respect to a variety of cyber security capabilities. Notwithstanding that extremely wide range of devices, these teachings permit using three and only three certification levels to adequately assess and represent, in a fair and relevant manner, the cyber security standing of essentially all IoT devices (though a greater or lesser number of certification levels could be utilized if desired). The assessments described herein are furthermore well-suited to replication and objective application by different entities in a manner that readily facilitates identical assessments and conclusions for a given IoT device by those various entities.

These and other benefits may become clearer upon making a thorough review and study of the following detailed description. Referring now to the drawings, and in particular to FIG. 1, an illustrative platform 100 that is compatible with many of these teachings will first be presented.

In this illustrative application setting the platform 100 serves to assess a given candidate IoT device 101. For the purposes of this description this IoT device 101 can be essentially any Internet-of-Things device including both wireline and wireless devices.

The activities described herein may be carried out, if desired, to some lesser or greater extent by one or more human operators. That said, this illustrative application setting also presumes the presence of a control circuit 102. Being a "circuit," the control circuit 102 comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 102 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 102 is configured (for example, by using corresponding programming as will be well understood by those skilled in the art) to carry out one or more of the steps, actions, and/or functions described herein.

By one approach this control circuit 102 includes integral memory. This memory can serve, for example, to non-transitorily store the computer instructions that, when executed by the control circuit 102, cause the control circuit 102 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

Generally speaking many of the activities described herein can be carried out in whole or in part by this control circuit 102. As one example in these regards, these teachings provide for accessing and reviewing the contents of textual documentation for candidate IoT devices. The control circuit 102 can be configured to utilize artificial intelligence to facilitate, in whole or in part, such a task. For example, artificial intelligence can serve to identify a portion of the documentation that presents a privacy policy, and can further be employed, if desired, to determine whether that privacy policy includes a particular clause, representation, or other substantive content. In many cases the control circuit 102 will share execution of the described activities with one or more human operators.

To facilitate the activities described herein this illustrative platform 100 includes a network traffic monitor 103 that is configured to receive and monitor network traffic conveyed between the IoT device 101 and, in a typical application setting, a network 104. This network 104 may be a local area network or may be, if desired, some part of the Internet. In this example the control circuit 102 is communicatively coupled to the IoT device 101 via the network 104 though other approaches in these regards could be accommodated as desired. Various network traffic monitors are known in the art and the present teachings are not overly sensitive to any particular choices in these regards assuming the selected network traffic monitor can carry out the tasks described herein.

This platform 100 also includes an enterprise management system 105 and may include one or more cloud services 106. (By one approach the platform 100 may be configured to instead access third party cloud services rather than providing its own cloud services.) These elements may be remotely located and accessed via the network 104. By another approach one or more of these elements may be physically local to the application setting and may even comprise, if desired, a part of the control circuit 102.

In this illustrative example the platform 100 includes documentation 107 for the IoT device 101. This documentation 107 may constitute hard copy and/or softcopy as desired. As one example, this documentation 107 may be obtained by the control circuit 102 via the network 104 from a remote server that supports the IoT device 101 (such as a website controlled by the manufacturer of the IoT device 101).

And lastly, in this illustrative example the platform 100 includes one or more physical tools 108. These tools 108 may be relatively standard hand tools such as screwdrivers or pliers or may comprise custom elements that may be preferred by the user in a given application setting (and perhaps as a function of the particular IoT device 101 being assessed at any given time).

Generally speaking, it will be presumed that this platform 100 provides an execution environment for IoT applications that make use of LTE communications and Wi-Fi communications that may be native to the IoT device 101. This description also presumes that this platform 100 provides support for encryption based on the Advanced Encryption Standard (AES) using a 128-bit key.

So configured, this platform 100 can serve to carry out a variety of tests and assessments as described herein to test and assess the IoT device 101 with respect to a wide variety of capabilities, operating characteristics, and support elements. Generally speaking, these teachings provide for using this platform 100 to assess the IoT device 101 in an orderly and sequential manner. Furthermore, the foregoing tests/ assessments are organized such that the IoT device 101 can be selectively considered with respect to various categorical levels that pertain, in general, to cyber security. In a typical application setting this platform 100 will typically be controlled and serviced by an authorized testing laboratory that will serve as an independent testing facility to assess a presented IoT device and to grant the corresponding certifications as appropriate.

In this description these categorical levels are simply referred to as category 1, category 2, and category 3. Generally speaking, category 1 assesses the IoT device 100 with respect to core IoT device security features while category 2 and category 3 make further assessments pertaining to security elements of increasing device complexity, sophistication, and manageability.

Figure 2:
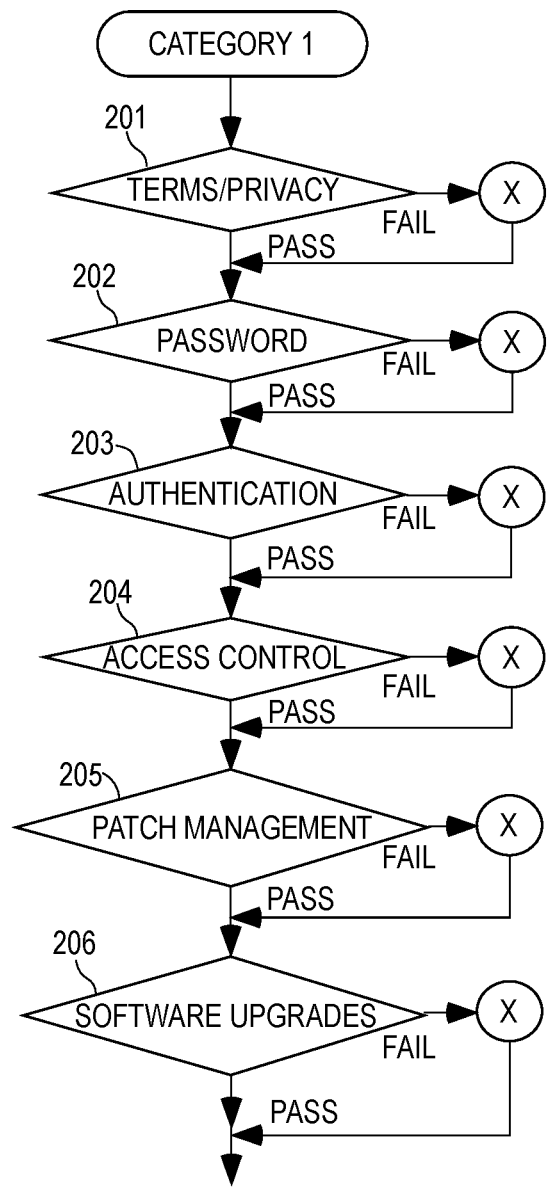
FIG. 2 comprises a flow diagram as configured in accordance with various embodiments of these teachings.

Referring now to FIG. 2, category 1 testing specifically provides for assessing, at block 201, certain terms of service and privacy policies that pertain to the IoT device 101, at block 202, password management as pertains to the IoT device 101, at block 203, authentication practices as pertain to the IoT device 101, at block 204, access control (and in particular role-based access control) as pertains to the IoT device 100, at block 205, patch management as pertains to the IoT device 101, and at block 206, software upgrade practices as pertain to the IoT device 101. At each of the aforementioned blocks the IoT device 101 is tested/assessed with respect to one or more corresponding criteria. Failing any such test/assessment results in failing to pass that particular set of criteria. A corresponding record can be maintained by the aforementioned control circuit 102 and/or one or more human operators. Each of these assessments will now be described in more detail.

Figure 3:
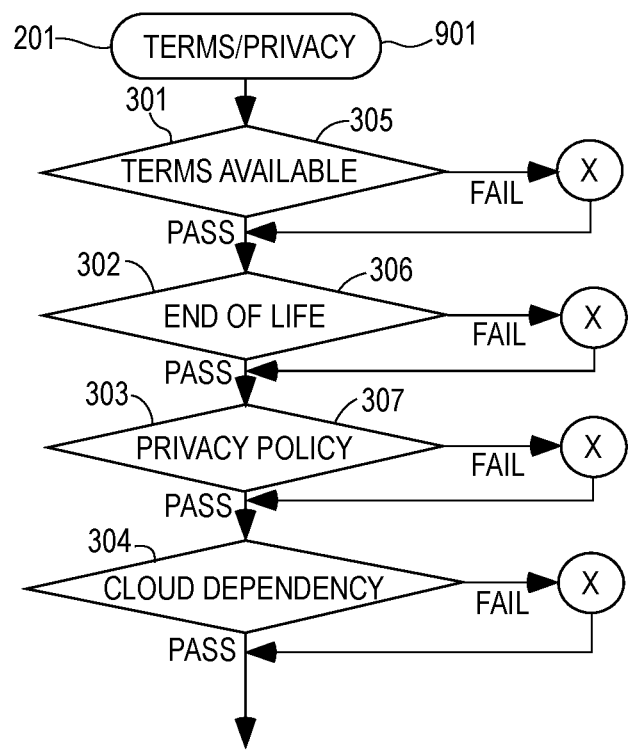
FIG. 3 comprises a flow diagram as configured in accordance with various embodiments of these teachings.

Referring now to FIG. 3, testing/assessing with respect to the terms of service and privacy policies will be described. Generally speaking, these activities are looking to confirm that terms of service and a privacy policy for the IoT device 101 are in fact available.

At block 301, the aforementioned IoT device documentation 107 is obtained (if not already available) and reviewed. If that documentation includes terms of service for this device 101, the device 101 passes this test. Otherwise, the device 101 fails.

At block 302, if the aforementioned IoT device documentation 107 covers "end-of-life" of the device, then the device 101 passes this test. Otherwise the device 101 fails. "End-of-life" information provides the end user with information regarding, for example, a planned obsolescence date beyond which compatibility with new releases may not be guaranteed or available.

At block 303, if the aforementioned IoT device documentation 107 includes a privacy policy, then the device 101 passes this test. Otherwise the device fails.

And at block 304, if the aforementioned IoT device documentation states either that the IoT device 101 has no dependencies on cloud services or, in the alternative, provides a list of cloud service dependencies, then the device 101 passes this test. Otherwise the device 101 fails.

A failure to pass any of the foregoing inquiries results in failing the assessment with respect to this criteria.

Figure 4:
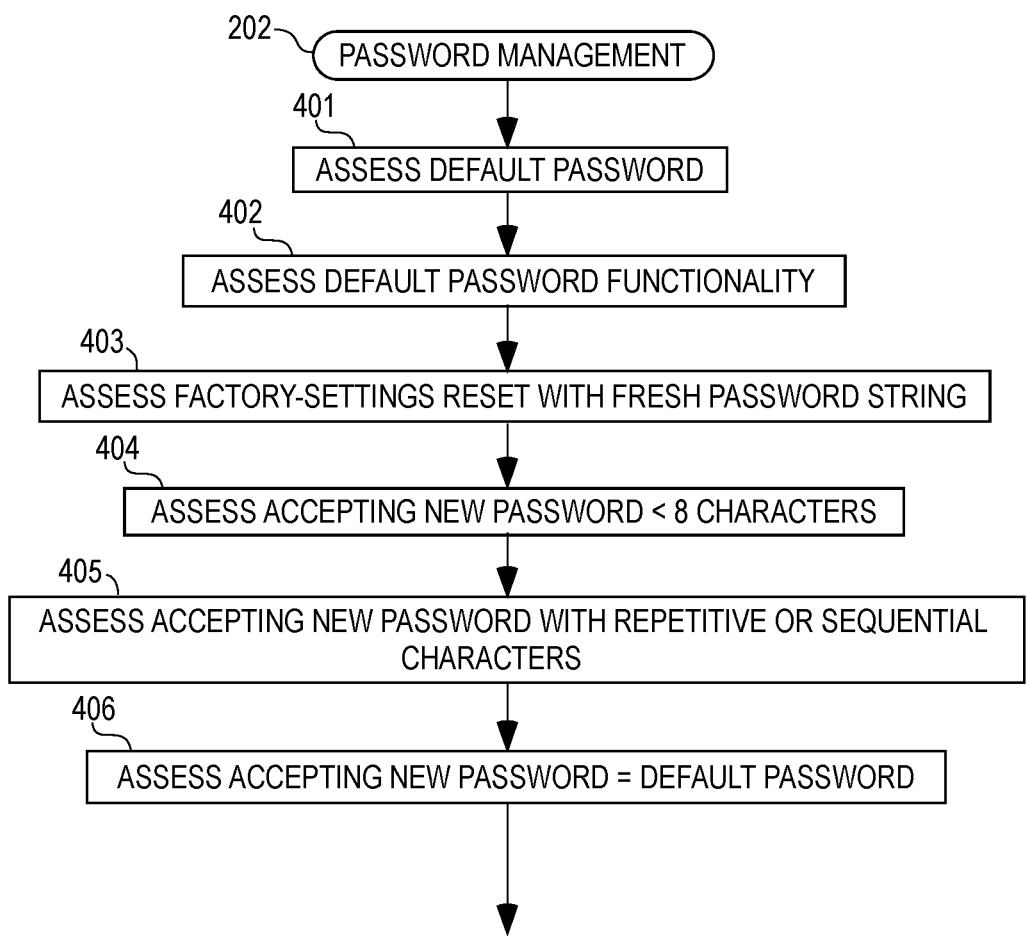
FIG. 4 comprises a flow diagram as configured in accordance with various embodiments of these teachings.

Referring now to FIG. 4, testing/assessing with respect to password management will be described. Generally speaking, these activities are looking to confirm that the IoT device 101 can locally manage user passwords.

At block 401, the process assesses the device's default password. As part of this, the default password is compared to a list of too-common passwords that are the same for many devices (for example, a word such as "admin"). Assessment parameters in these regards can be selected as desired. For example, a word may be considered "too-common" if the word is used with at least 5 percent of password-protected devices as a default password, or at least 20 percent, or at least 50 percent, as desired. As another part of this, the default password is compared to other alphanumeric strings that are specific to the IoT device 101 itself (to determine, for example, if the default password is identical to or at least substantially based on the device's serial number or MAC address or the like). If either of the foregoing conditions are true, the device 101 fails this assessment. Otherwise, the device 101 passes.

At block 402, the process assesses functionality associated with use of the default password. This activity provides for attempting to begin normal operation of the device 101 before changing any passwords. If the device 101 refuses to begin normal operation or forces a change to the default password, then the device 101 passes this assessment. Otherwise, the device 101 fails.

At block 403, the process assesses resetting factory settings for the device 101 in conjunction with a fresh password string. This activity provides for setting the password to a fresh character string and then performing a procedure to restore the device to factory settings per the device's documentation. If the device 101 refuses to begin normal operation or forces the user to change any default passwords, then the device 101 passes. Otherwise, the device 101 fails.

At block 404, the process assesses device behavior when setting a password to a fresh character string. This activity provides for setting a new password to a string less than eight characters. If the device 101 refuses to set the password to the new string, the device 101 passes. This activity also provides for setting the password to a fresh character string having at least eight characters. If the device sets the password to the provided string, then the device 101 passes. Otherwise, the device 101 fails.

At block 405, the process assesses whether the device 101 will accept a new password with repetitive or sequential characters. This activity provides for setting a new password having repetitive characters (such as "aaaaaaaa") and a new password having unduly sequential characters (such as "12345678," "lmnopqrst," or "1234abcd"). The criteria by which a string is deemed "unduly sequential" can vary with the application setting as desired. As one example, this assessment may require that a password not contain any numeric or alphabetic string having at least four sequential characters. If the device 101 refuses to set the password to the provided strings, the device 101 passes. Otherwise, the device 101 fails.

Lastly, at block 406, the process assesses whether the device 101 will accept a new password that is identical to the default password. If the device 101 refuses to set the password to the default value, the device 101 passes. Otherwise, the device 101 fails.

Other assessments can be included if desired. For example, by one approach, this categorical assessment can assess whether the device 101 discloses passwords for other less privileged users. If true, the device 101 can be considered to have failed this assessment. (Some devices may permit a most privileged user to have the ability to set passwords for other less-privileged users, but even a device offering this capability should not allow the most privileged user to learn any current password for other users.)

A failure to pass any of the foregoing assessments results in failing the assessment with respect to this password-management criterion.

Figure 5:
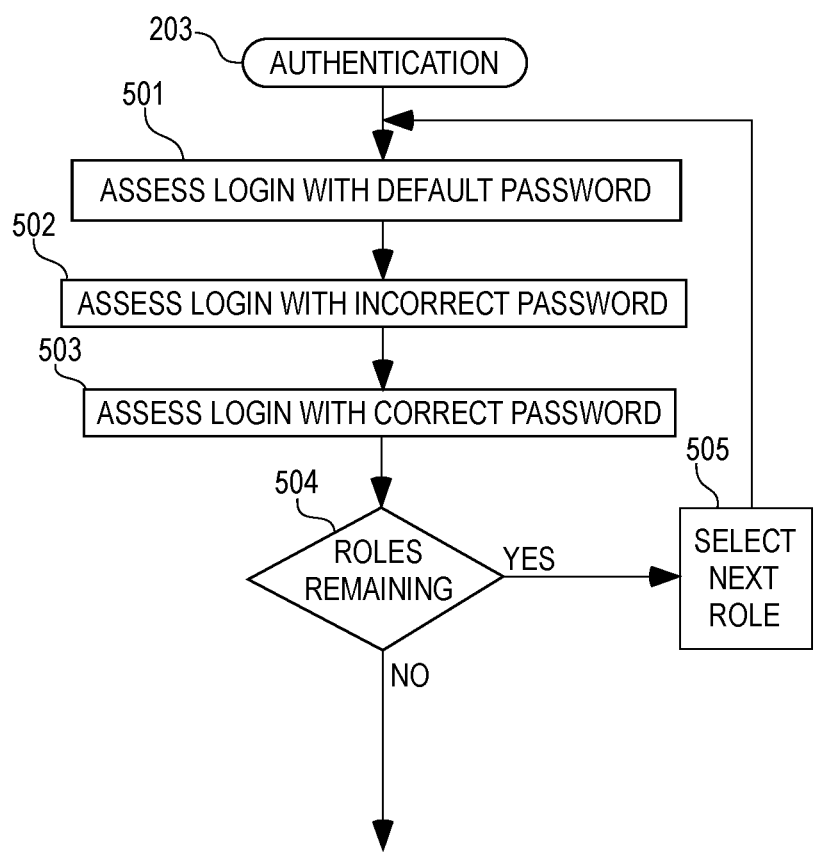
FIG. 5 comprises a flow diagram as configured in accordance with various embodiments of these teachings.

Referring now to FIG. 5, assessing the IoT device 101 with respect to authentication will be described. Generally speaking, these activities are looking to confirm that the IoT device 101 supports user authentication. More particularly, this overall assessment looks to confirm that the IoT device 101 requires user login to perform any privileged actions.

At block 501, the process assesses whether the device 101 permits logging in with only a default password. If true, the device 101 fails this assessment. Otherwise, the device 101 passes.

At block 502, the process assesses whether the device 101 permits logging in with an incorrect password. If true, the device 101 fails this assessment. Otherwise, the device 101 passes.

At block 503, the process assesses whether the device 101 permits logging in with a correct non-default password. If true, the device 101 passes this assessment. Otherwise, the device 101 fails.

At block 504, the process determines whether the device 101 supports more than one authenticated role. When true, the process selects the next level at block 505 and repeats at least some of the foregoing assessments.

A failure to pass any of the foregoing assessments results in failing the assessment with respect to this authentication criterion.

Figure 6:
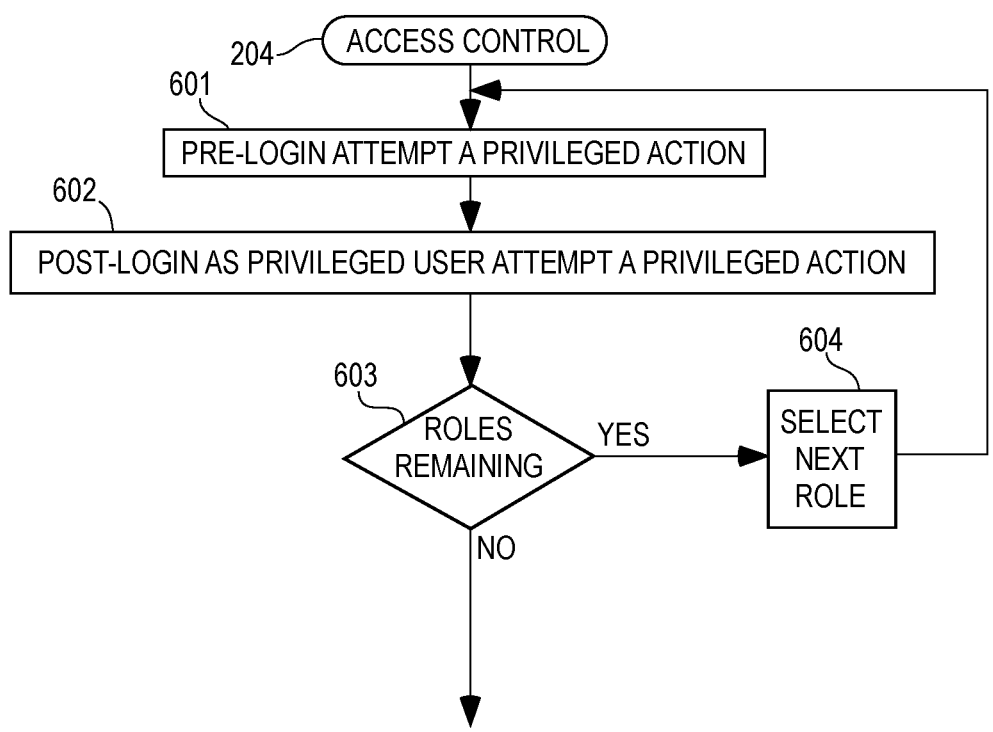
FIG. 6 comprises a flow diagram as configured in accordance with various embodiments of these teachings.

Referring now to FIG. 6, assessing the IoT device 101 with respect to access controls will be described. Generally speaking, these activities are looking to confirm that the device 101 enforces role-based access control.

At block 601, the process assesses whether the device 101 will perform a privileged action (that is described in the documentation for the device 101) prior to logging in. If true, the device 101 fails this assessment. Otherwise, the device 101 passes.

At block 602, the process assesses whether the device 101 will perform a documented privileged action following a login by a user demonstrating adequate privilege. If true, the device 101 passes this assessment. Otherwise, the device 101 fails.

At block 603, the process determines whether the device supports more than one authenticated role. When true, the process selects the next level at block 604 and repeats at least some of the foregoing assessments.

A failure to pass any of the foregoing assessments results in failing the assessment with respect to this access control criterion.

Figure 7:
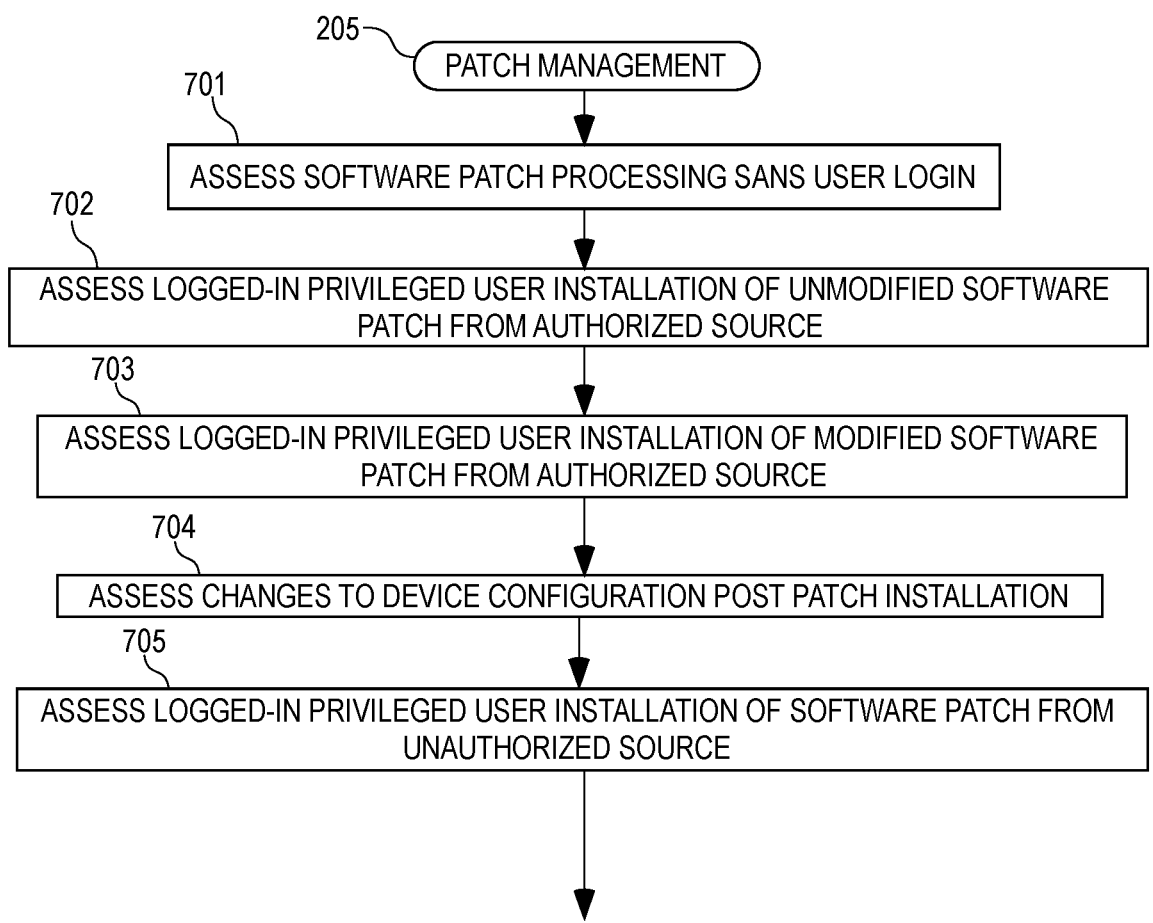
FIG. 7 comprises a flow diagram as configured in accordance with various embodiments of the invention.

Referring now to FIG. 7, assessing the IoT device 101 with respect to patch management will be described. Generally speaking, these activities are looking to confirm that the device 101 supports automatic and manual installation of software patches from an authorized source in order to correct software problems and fix capabilities (In this illustrative example, support for the downloading of software patches from a remote location is not required for category 1 assessments. Such a capability, however, may be the most feasible approach to patch management regardless of the assessment category.)

At block 701, the process assesses whether the device 101 will observe that a software patch is available, download that patch, check that the patch is unmodified from an authorized source, and then, at an appropriate time, install the software patch, all without any user login. If the device 101 installs an unmodified patch from an authorized source sans user login per the foregoing, the device 101 passes this assessment. Otherwise, the device 101 fails.

At block 702, the process assesses whether the device 101, following login by a user having adequate privilege, will try to install an unmodified software patch from an authorized source. Again, if the device 101 installs the unmodified software patch from an authorized source under these conditions, the device 101 passes this assessment. Otherwise, the device 101 fails.

At block 703, the process assesses whether the device 101, following login by a user having adequate privilege, will at least attempt to install a software patch from an authorized source but which has been modified. If the device 101 refuses to install such a software patch, the device 101 passes this assessment. Otherwise, the device 101 fails.

At block 704, the process assesses whether the device 101, after successfully installing a software patch, has also permitted a change to the device configuration. If the device configuration has not changed, the device 101 passes this assessment. Otherwise, the device 101 fails.

And at block 705, the process assesses whether the device 101, following login by a user having adequate privilege, will at least attempt to install a software patch from an unauthorized source. If the device 101 refuses to install a software patch under such conditions, then the device 101 passes this assessment. Otherwise, the device 101 fails.

A failure to pass any of the foregoing assessments results in failing the assessment with respect to this software patch criterion.

Figure 8:
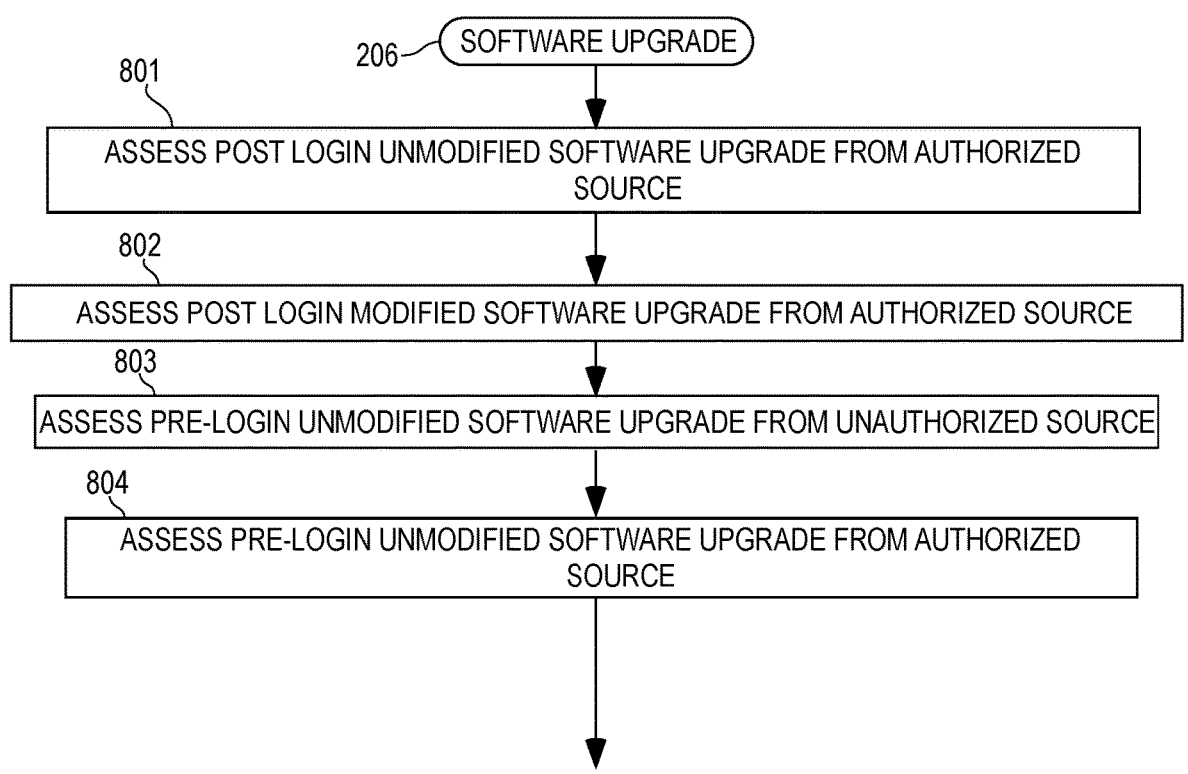
FIG. 8 comprises a flow diagram as configured in accordance with various embodiments of these teachings.

Referring now to FIG. 8, assessing the IoT device 101 with respect to software upgrades will be described. Generally speaking, these activities are looking to confirm that the device 101 supports manual installation of software upgrades from an authorized source in order to migrate to a newer version that may contain additional features.

At block 801, the process assesses, after a user logs in with adequate privilege, trying to install an unmodified software upgrade from an authorized source. If the device 101 installs the software upgrade, the device 101 passes this assessment. Otherwise, the device 101 fails.

At block 802, the process assesses, after a user logs in with adequate privilege, trying to install a software upgrade from an authorized source where the software upgrade has been modified (i.e., modified in comparison to its unmodified released content). If the device 101 refuses to install the software upgrade, the device 101 passes this assessment. Otherwise, the device 101 fails.

At block 803, the process assesses, after a user logs in with adequate privilege, trying to install a software program from an unauthorized source. If the device 101 refuses to install the software upgrade, then the device 101 passes this assessment. Otherwise, the device 101 fails.

And at block 804, the process assesses, prior to a user logging in, trying to install an authentic and unmodified software upgrade from an authorized source. If the device 101 refuses to install the software upgrade, then the device 101 passes this assessment. Otherwise, the device 101 fails.

This categorical assessment regarding software upgrades can include another assessment if desired. In particular, the process can assess, after successfully installing a software upgrade, whether the installation changed the device configuration. If the device configuration has not changed, the device 101 can be deemed to have passed this assessment. Otherwise, the device 101 can be deemed to have failed. (This assessment can take into account that new configuration settings associated with new features in the software update will, often necessarily, have corresponding default settings by only assessing whether old configuration settings remain unchanged.)

A failure to pass any of the foregoing assessments results in failing this assessment with respect to this software upgrade criterion.

The foregoing tests and assessments constitute and complete the category 1 certification tests per this illustrative example. Category 2 presumes first that the IoT device 101 has passed all of the tests/assessments of category 1. Category 2 tests/assessments then proceed to further assess the IoT device 101 with respect to a managed network.

Figure 9:
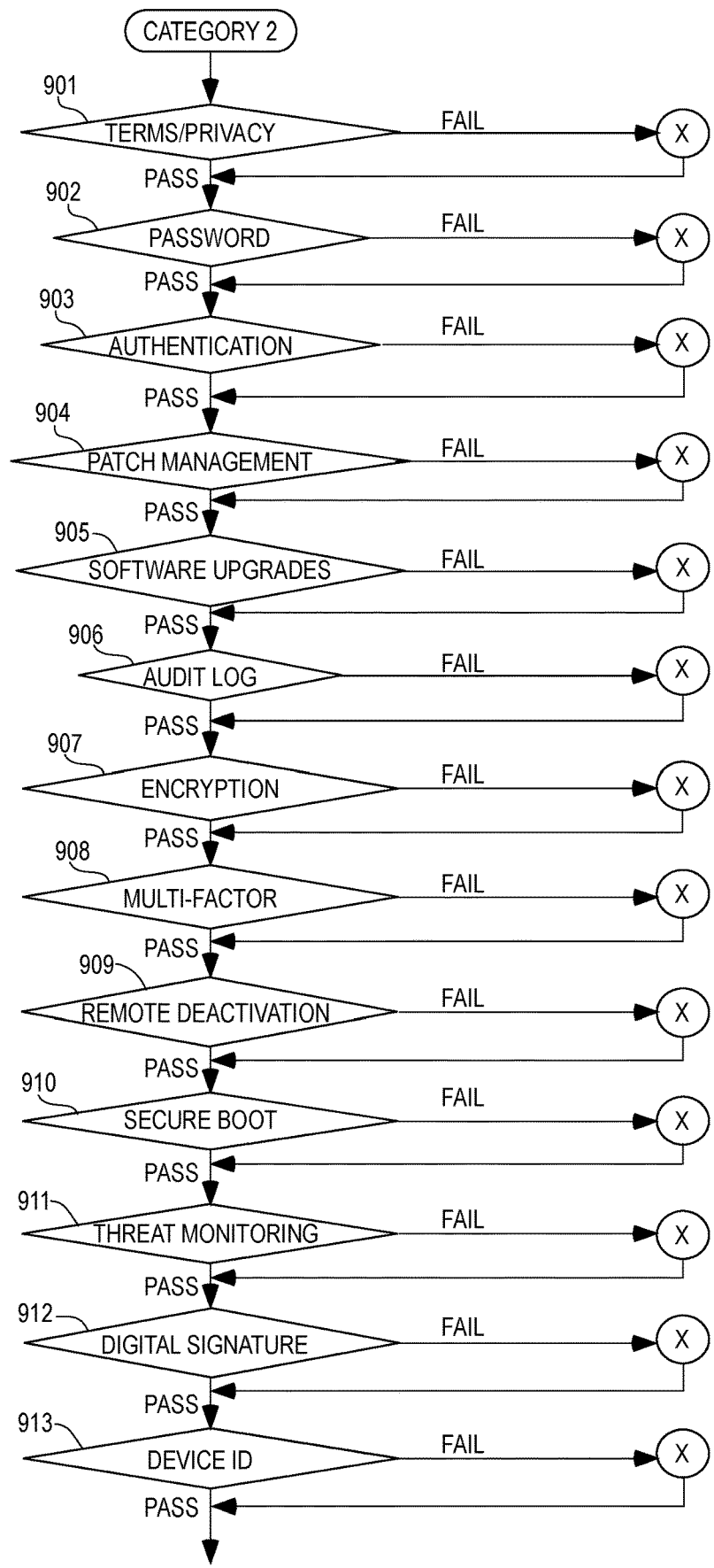
FIG. 9 comprises a flow diagram as configured in accordance with various embodiments of the invention.

Referring now to FIG. 9, category 2 testing specifically provides for assessing, at block 901, certain terms of service and privacy policies that pertain to the IoT device 101, at block 902, password management as pertains to the IoT device 101, at block 903, authentication practices as pertain to the IoT device 101, at block 904, patch management as pertains to the IoT device 100, at block 905, software upgrades practices as pertains to the IoT device 101, at block 906, audit log practices as pertain to the IoT device 101, at block 907, encryption practices as pertain to the IoT device 101, at block 908, multi-factor practices as pertain to the IoT device 101, at block 909, remote deactivation practices as pertain to the IoT device 101, at block 910, secure boot practices as pertain to the IoT device 101, at block 911, threat monitoring practices as pertain to the IoT device 101, at block 912, digital signature practices as pertain to the IoT device 101, and at block 913, device identifier practices as pertain to the IoT device 101. At each of the aforementioned blocks the IoT device 101 is tested/assessed with respect to one or more corresponding criteria. Failing any such test/assessment results in failing to pass that particular set of criteria. A corresponding record can be maintained by the aforementioned control circuit 102 and/or one or more human operators. Each of these assessments will now be described in more detail.

As regards assessing category 2 terms of service and privacy policies, reference may again return to FIG. 3. At block 305, this process assesses whether the IoT device documentation 107 describes the process for updating the terms of service for the device 101. If true, the device 101 passes this assessment. Otherwise, the device 101 fails.

At block 306, this process assesses whether the terms of service for the device 101 as set forth in the IoT device documentation 107 states the expected life of the product (for example, as a specified number of years) during which the device 101 will be supported by the manufacturer, distributor, or other responsible party. If true, the device 101 passes this assessment. Otherwise, the device 101 fails.

And lastly, at block 307, this process assesses whether the IoT device documentation 107 describes a process for updating the privacy policy for the device 101. If true, the device 101 passes this assessment. Otherwise, the device 101 fails.

A failure to pass any of the foregoing assessments results in failing the assessment with respect to these terms of service and privacy policy criteria.

Figure 10:
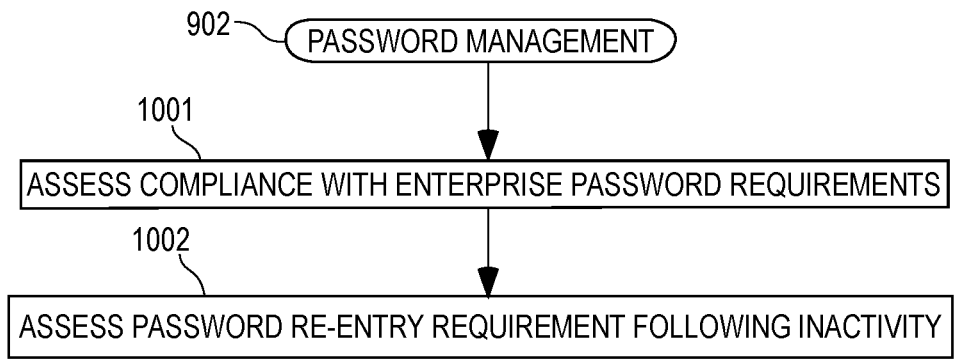
FIG. 10 comprises a flow diagram as configured in accordance with various embodiments of these teachings.

Referring now to FIG. 10, assessing the IoT device 101 with respect to password management will be described. Generally speaking, these activities are looking to confirm that the device 101 can be integrated with an enterprise account management system.

At block 1001, the process assesses compliance with enterprise password requirements. More specifically, the process attempts to set the password to a string that is prohibited by the enterprise account management system. For example, the enterprise account management system may prohibit use of particular text strings or may have requirements that specify using both upper and lower case characters and/or special characters such as "#," "!," or "$." If the device 101 forces the user to change such a password to a string that is acceptable to the enterprise account management system (for example, by refusing to accept the proffered new password), the device 101 passes this assessment. Otherwise, the device 101 fails.

At block 1002, the process assesses password reentry requirements following a period of inactivity. In particular, after logging in, this assessment provides for remaining inactive for a time that exceeds the documented time interval specified by the enterprise account management system. This assessment then provides for attempting to perform some action. If the device 101 requires reentry of the password before permitting performance of any such action, the device 101 passes this assessment. Otherwise, the device 101 fails.

A failure to pass any of the foregoing assessments results in failing the assessment with respect to these terms of service and privacy policies criteria.

Figure 11:
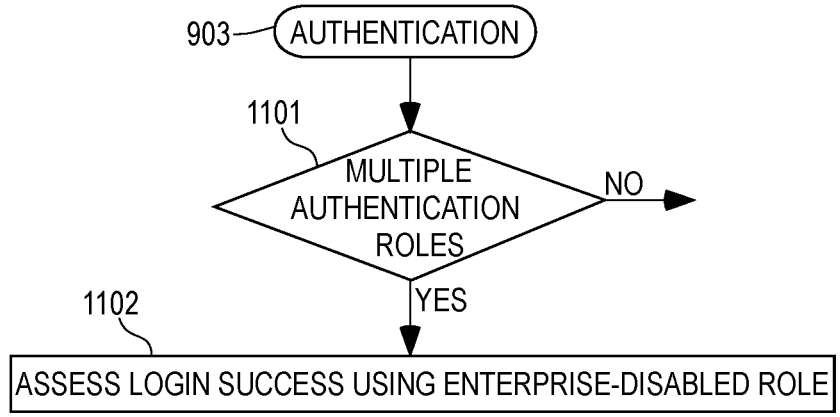
FIG. 11 comprises a flow diagram as configured in accordance with various embodiments of these teachings.

Referring now to FIG. 11, assessing the IoT device 101 with respect to authentication practices will be described. Generally speaking, these activities are looking to confirm that the device 101 supports user authentication.

At block 1101, the process determines whether the device supports more than one authenticated rule. When false, this assessment can conclude with a passing rating. When true, at block 1102 the process assesses whether the device 101 will permit a login success using an enterprise-disabled role. If this happens, the device 101 fails this assessment. If the device 101 does not permit a login success using an enterprise-disabled role, the device 101 passes this assessment.

Figure 12:
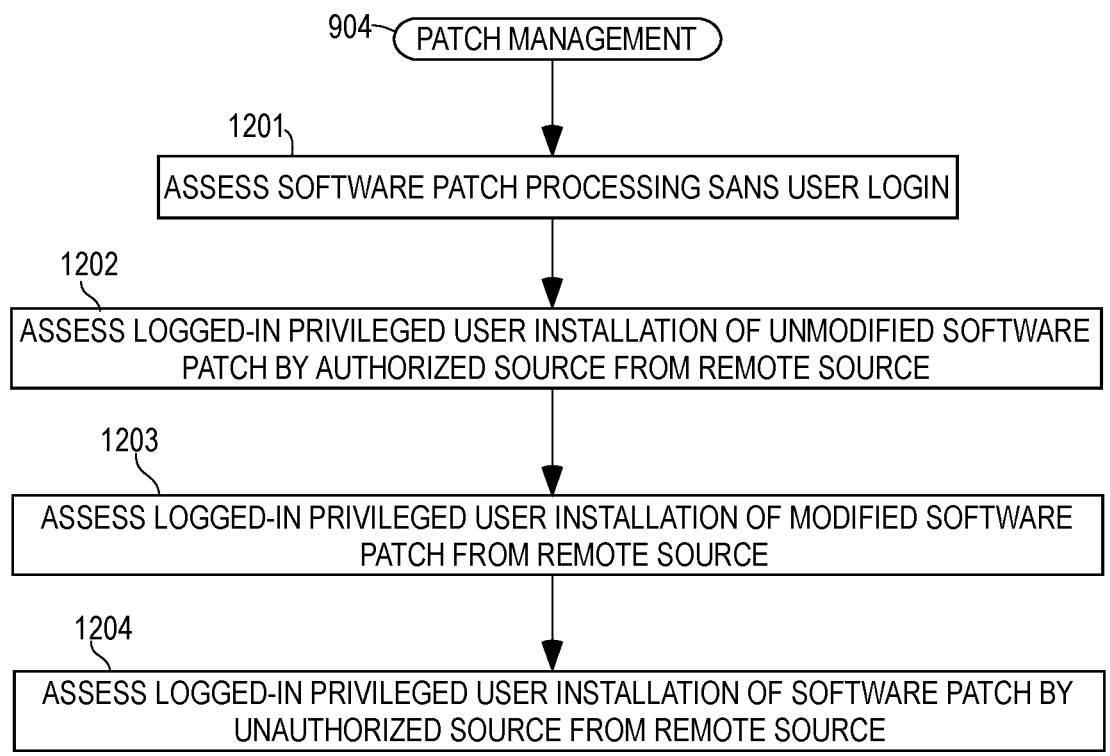
FIG. 12 comprises a flow diagram as configured in accordance with various embodiments of these teachings.

Referring now to FIG. 12, assessing the IoT device 101 with respect to patch management practices will be described. Generally speaking, these activities are looking to confirm that the device 101 supports the download of software patches from a remote location in order to correct software problems and fix vulnerabilities.

At block 1201, the process assesses whether the device 101 will observe that a software patch is available, download that patch from a remote location, check that the patch is unmodified from an authorized source, and then, at a time when it is safe and appropriate, install the software patch, all without any user login. If the device 101 installs the software patch per the foregoing, the device 101 passes this assessment. Otherwise, the device 101 fails.

At block 1202, the process assesses whether the device 101, after a user has logged in with adequate privilege, can download an unmodified software patch from a remote location that was produced by an authorized source, and then install that patch. If the device 101 installs the software patch per the foregoing, the device 101 passes this assessment. Otherwise, the device 101 fails.

At block 1203, the process assesses whether the device 101, after a user has logged in with adequate privilege, will download a modified software patch from a remote location and then at least attempt to install that patch. If the device 101 refuses to install this software patch, the device 101 passes this assessment. Otherwise, the device 101 fails.

At block 1204, the process assesses whether the device 101, after a user has logged in with adequate privilege, will download a software patch from a remote location that was produced by an unauthorized source, and then install that patch. If the device 101 refuses to install this software patch, the device 101 passes this assessment. Otherwise, the device 101 fails.

A failure to pass any of the foregoing assessments results in failing the assessment with respect to these patch management criteria.

Figure 13:
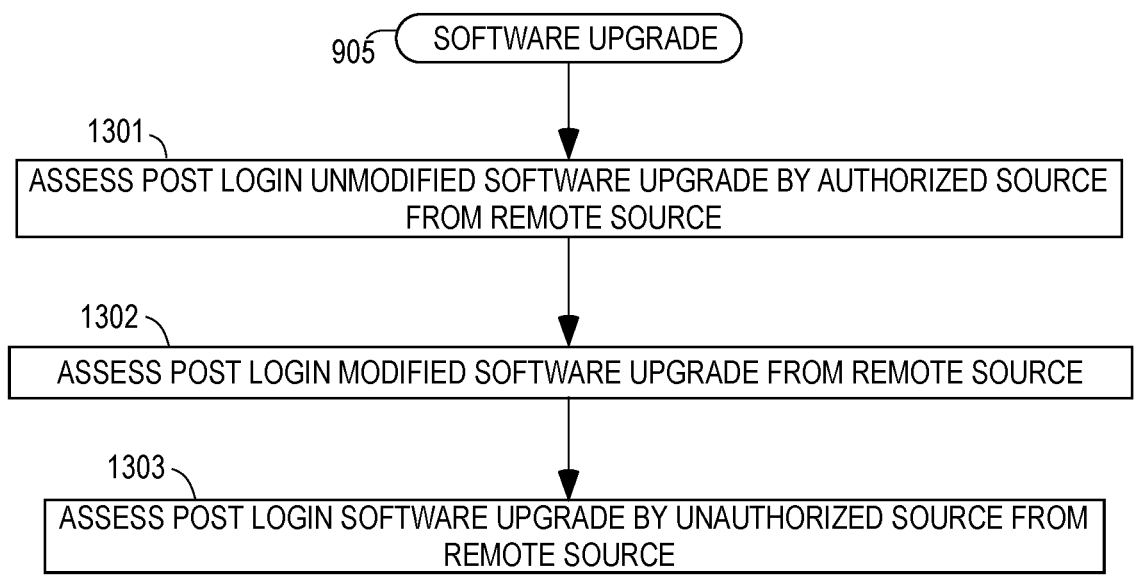
FIG. 13 comprises a flow diagram as configured in accordance with various embodiments of these teachings.

Referring now to FIG. 13, assessing the IoT device 101 with respect to software upgrades practices will be described. Generally speaking, these activities are looking to confirm that the device 101 supports the download of software upgrades from a remote location and installation of software upgrades from an authorized source in order to migrate to a newer version that may contain additional features.

At block 1301, the process assesses, following login by a user with adequate privilege, whether the device 101 will download an unmodified software upgrade from a remote location and an authorized source and then install the upgrade. If the device 101 installs the software upgrade per the foregoing, the device 101 passes the assessment. Otherwise, the device 101 fails.

At block 1302, the process assesses, following login by a user with adequate privilege, whether the device will download from a remote location a modified software upgrade and then install the upgrade. If the device 101 refuses to install the software upgrade under these conditions, the device 101 passes the assessment. Otherwise, the device 101 fails.

And, at block 1303, the process assesses, following login by a user with adequate privilege, whether the device 101 will download from a remote location a software upgrade from an unauthorized source and then install that upgrade. If the device 101 refuses to install this software upgrade, the device 101 passes this assessment. Otherwise, the device 101 fails.

A failure to pass any of the foregoing assessments results in failing the assessment with respect to these software upgrade criteria.

Figure 14:
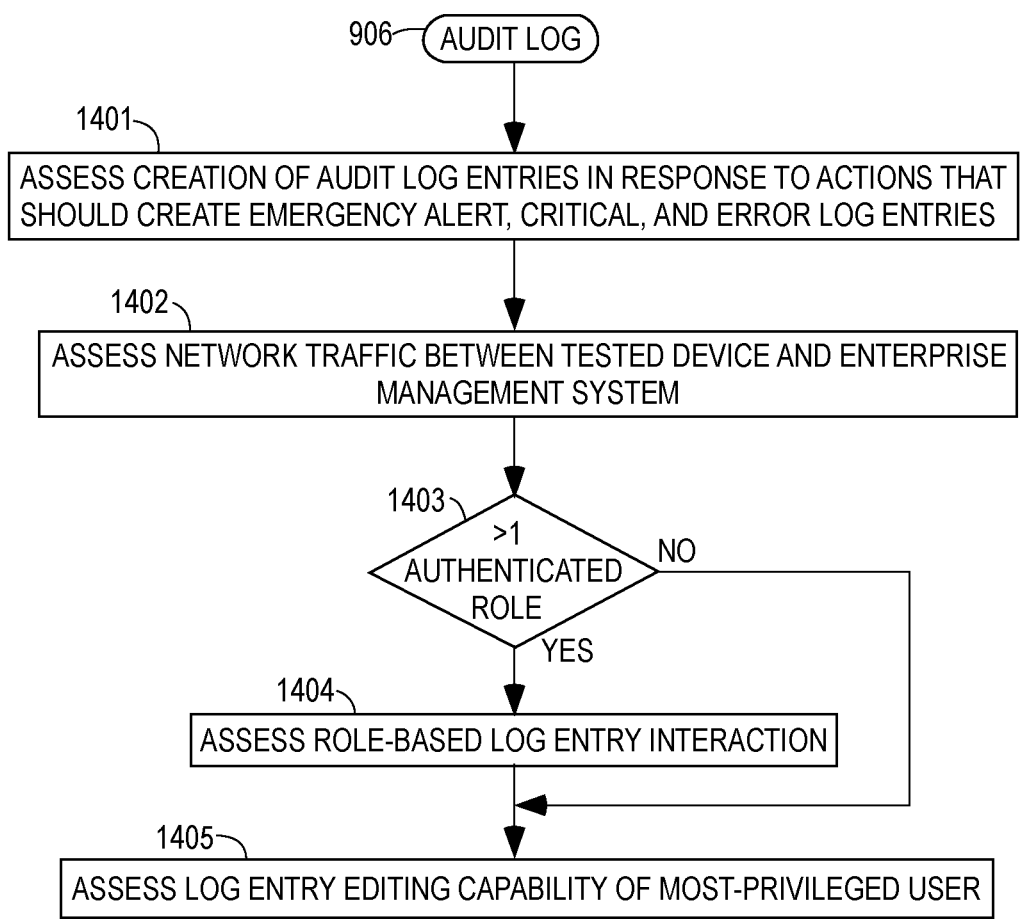
FIG. 14 comprises a flow diagram as configured in accordance with various embodiments of these teachings.

Referring now to FIG. 14, assessing the IoT device 101 with respect to audit log practices will be described. Generally speaking, these activities are looking to confirm that the device 101 supports the gathering and reporting of audit log events to an enterprise management system.

At block 1401, the process provides for performing some actions that will create emergency, alert, critical, and error audit log entries per the IoT device documentation 107. The process then assesses whether the expected audit log entries are present in the enterprise management system audit log. When true, the device 101 passes this assessment. Otherwise, the device 101 fails.

At block 1402, the process observes network traffic between the device 101 and the enterprise management system 105 (using, for example, the aforementioned network traffic monitor 103). If a TLS-protected session or DTLS-protected session is used to transfer the audit log entries that exceed the established audit event reporting threshold are transferred in SySLog format within the configured time interval, the device 101 passes this assessment. Otherwise, the device 101 fails.

At block 1403 the process determines whether the device supports more than one authenticated role. If such is the case, at block 1404 of the process provides for attempting to view and delete audit log entries using roles that are not authorized to perform these privileged actions. If the device 101 permits such actions under these conditions, the device 101 fails this assessment. Otherwise, the device 101 passes.

At block 1405, the process provides for logging in as the most privileged user and then trying to change an audit log entry. If the device 101 allows an audit entry to be changed, then the device 101 fails this assessment. Otherwise, the device 101 passes. (It is of course possible that the most privileged user may be able to delete entries from the audit log but that capability is irrelevant and not considered in the present assessment. This assessment also ignores whether audit log entries are automatically purged on the basis of age when a configured size limit is reached.)

A failure to pass any of the foregoing assessments results in failing the assessment with respect to these audit log behavior criteria.

Figure 15:
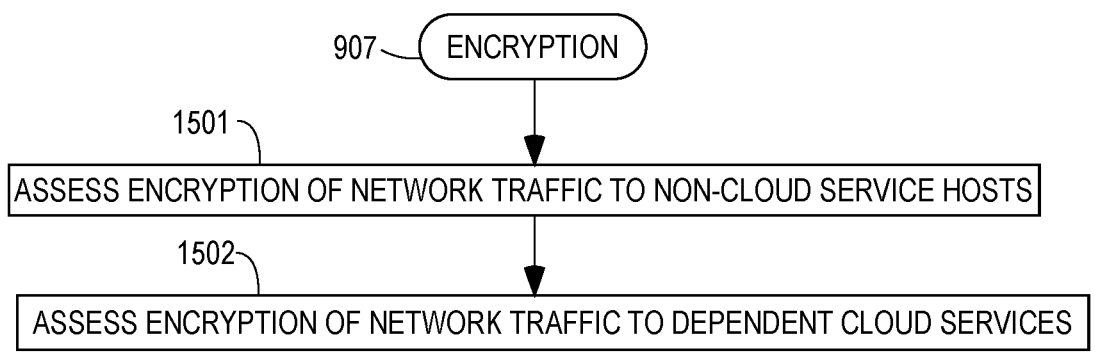
FIG. 15 comprises a flow diagram as configured in accordance with various embodiments of these teachings.

Referring now to FIG. 15, assessing the IoT device 101 with respect to encryption practices will be described. Generally speaking, these activities are looking to confirm that the device 101 supports encrypted communications using transport layer security (TLS) or datagram transport layer security (DTLS). These assessments presume configuring the device 101 to use TLS or DTLS to encrypt network traffic with 128-bit AES. The aforementioned network traffic monitor 103 can serve to monitor the network traffic to facilitate this assessment.

At block 1501, the process performs actions that will generate network traffic to hosts other than cloud services 106. Based upon readings of the network traffic monitor 103, the process assesses whether the network traffic is protected with TLS or DTLS using 128-bit AES. When true, the device 101 passes this assessment. Otherwise, the device 101 fails.

At block 1502, the process performs actions that will generate network traffic to a cloud services that the device 101 depends upon as identified, for example, in the IoT device documentation 107. If that traffic is protected with TLS or DTLS using 128-bit AES, the device 101 passes this assessment. Otherwise, the device 101 fails.

A failure to pass any of the foregoing assessments results in failing the assessment with respect to these encryption usage criteria.

Figure 16:
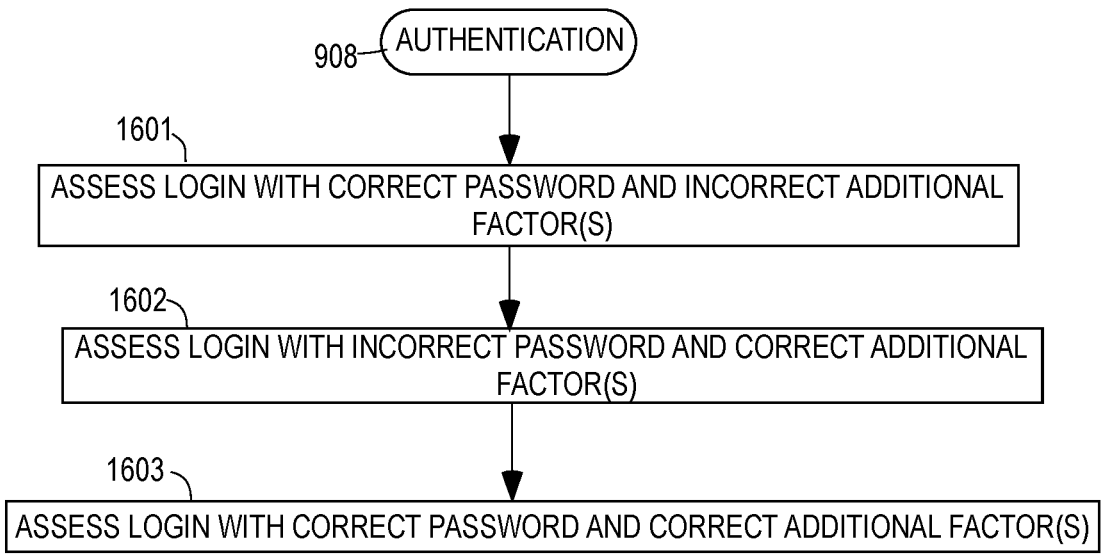
FIG. 16 comprises a flow diagram as configured in accordance with various embodiments of these teachings.

Referring now to FIG. 16, assessing the IoT device 101 with respect to multi-factor authentication practices will be described. Generally speaking, these activities are looking to confirm that the device 101 is configured to require two different authentication factors for logging. One factor can be, for example, a password while a second factor can be a biometric factor (based upon something the user is) or possession of a particular physical object. Many other possibilities exist.

At block 1601, the process assesses login success using a correct password and an incorrect additional factor. If the login is unsuccessful, the device 101 passes the assessment. Otherwise, the device 101 fails.

At block 1602, the process assesses login success using an incorrect password and a correct additional factor. If the login is unsuccessful, the device 101 passes the assessment. Otherwise, the device 101 fails.

And at block 1603, the process assesses login success using a correct password with the corresponding correct additional factor (or factors). If the login is successful, the device 101 passes the assessment. Otherwise, the device 101 fails.

A failure to pass any of the foregoing assessments results in failing the assessment with respect to these multi-factor authentication criteria.

Figure 17:
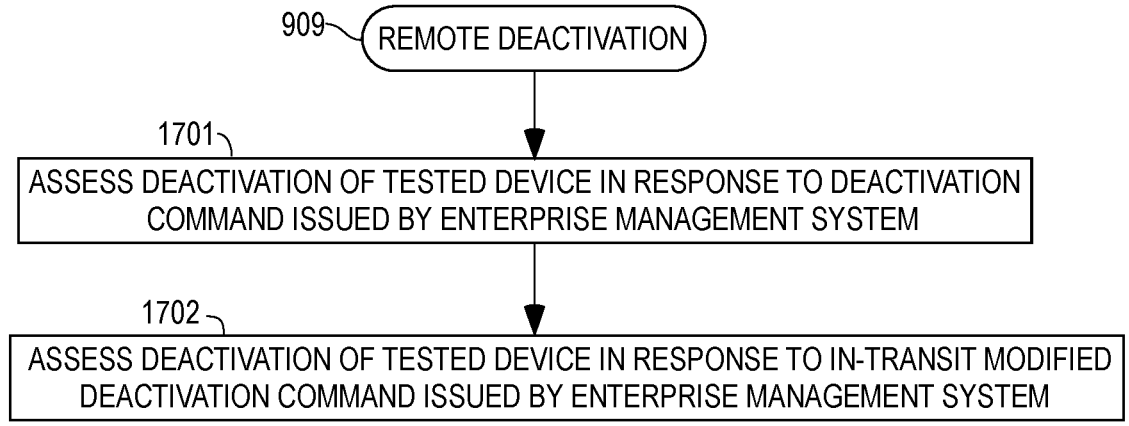
FIG. 17 comprises a flow diagram as configured in accordance with various embodiments of the invention.

Referring now to FIG. 17, assessing the IoT device 101 with respect to remote activation practices will be described. Generally speaking, these activities are looking to confirm that the device 101 can be remotely deactivated by the enterprise management system 105.

At block 1701, the process provides for issuing a deactivation command from the enterprise management system 105 and observing transmission of the authenticated command from the enterprise management system 105 to the device 101. The process then assesses whether the device 101 deactivates in response to the foregoing command. When true, the device 101 passes this assessment. Otherwise, the device 101 fails.

And at block 1702, the process provides for again issuing a deactivation command from the enterprise management system 105, but for then capturing the command at the network traffic monitor 103 where the captured command is modified before being sent to the device 101. The process then assesses whether the device 101 deactivates in response to the modified command. When true, the device 101 fails this assessment. Otherwise, the device 101 passes.

A failure to pass any of the foregoing assessments results in failing the assessment with respect to these remote deactivation criteria.

Figure 18:
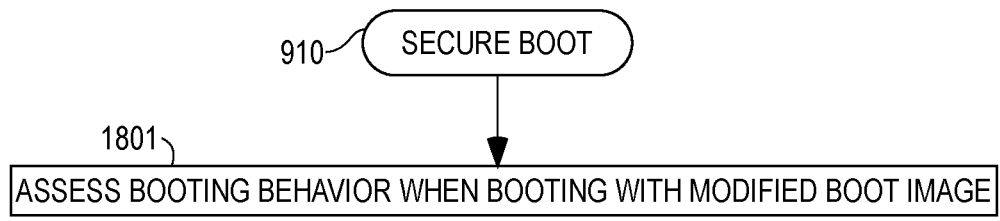
FIG. 18 comprises a flow diagram as configured in accordance with various embodiments of these teachings.

Referring now to FIG. 18, assessing the IoT device 101 with respect to secure boot practices will be described. Generally speaking, these activities are looking to confirm that the device 101 protects the integrity of the boot process.

At block 1801, the process assesses booting behavior when booting the device 101 in an out-of-the-box configuration with a modified image. If the device's integrity mechanism detects the modification and aborts the boot, the device 101 passes this assessment. Otherwise, the device 101 fails. By one approach, this assessment requires two or more such attempts using differently modified images.

Figure 19:
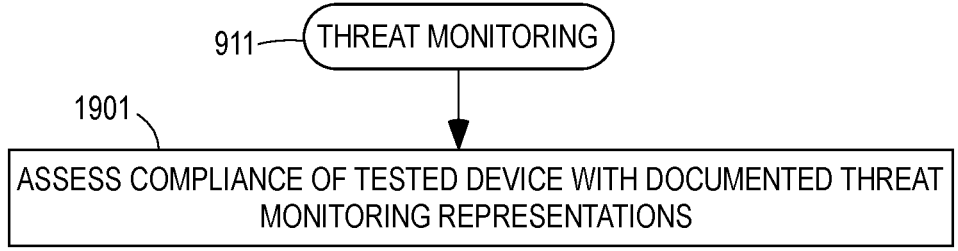
FIG. 19 comprises a flow diagram as configured in accordance with various embodiments of the invention.

Referring now to FIG. 19, assessing the IoT device 101 with respect to threat monitoring practices will be described. Generally speaking, these activities are looking to confirm that the device 101 supports the logging of anomalous or malicious activity based on configured policies and rules that appear in the aforementioned IoT device documentation 107.

At block 1101, the process provides for taking actions that will trigger previously configured policies and rules and then viewing the local audit log. If the expected audit log entries are present in that audit log, the device 101 passes this assessment. Otherwise, the device 101 fails.

Figure 20:
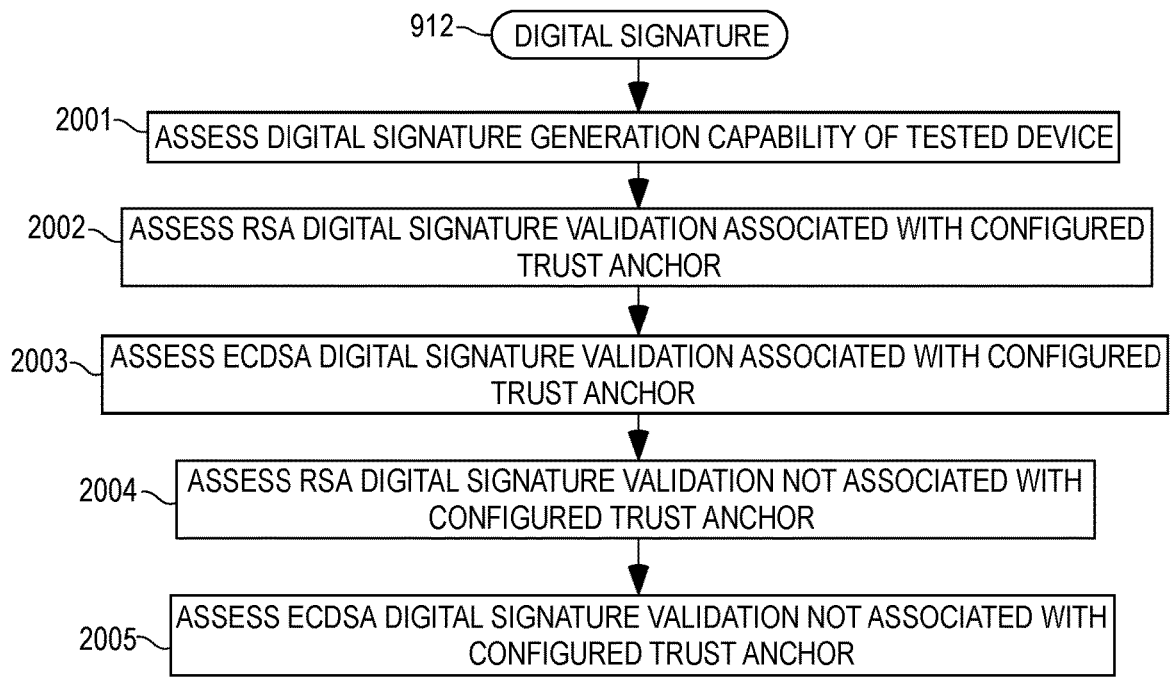
FIG. 20 comprises a flow diagram as configured in accordance with various embodiments of these teachings.

Referring now to FIG. 20, assessing the IoT device 101 with respect to authentication practices will be described. Generally speaking, these activities are looking to confirm that the device 101 can generate an RSA or elliptic curve digital signature algorithm (ECDSA) digital signature and that the device 101 can validate RSA and ECDSA digital signatures using a set of trust anchors. The assessments performed here presume generating or installing a digital signature private key for use with either RSA or ECDSA and obtaining an X.509 certificate that includes the public key that corresponds to the foregoing digital signature private key. These assessments also presume configuring at least one trust anchor that can be used to validate an RSA digital signature and at least one other trust anchor that can be used to validate an ECDSA digital signature.

At block 1101, the process provides for trying to generate a digital signature using either RSA or ECDSA in the P7S format that includes the X.509 certificate of the device 101. The process assesses whether the device 101 produces a valid digital signature. When true, the device 101 passes this assessment. Otherwise, the device 101 fails.

At block 2002, this process provides for trying to validate a correct RSA digital signature in the P7S format that is associated with a configured trust anchor as described above. The process assesses whether the device 101 validates the signature. When true, the device 101 passes this assessment. Otherwise, the device 101 fails.

At block 2003, this process provides for trying to validate a correct ECDSA digital signature in the P7S format that is associated with a configured trust anchor as described above. The process assesses whether the device 101 validates this signature. When true, the device 101 passes this assessment. Otherwise, the device 101 fails.

At block 2004, this process provides for trying to validate a correct RSA digital signature in the P7S format that is not associated with a configured trust anchor. The process assesses whether the device 101 validates the signature. When true, the device 101 fails this assessment. Otherwise, the device 101 passes.

And at block 2005, this process provides for trying to validate a correct ECDSA digital signature in the P7S format that is not associated with a configured trust anchor. The process assesses whether the device 101 validates the signature. When true, the device 101 fails this assessment. Otherwise, the device 101 passes.

A failure to pass any of the foregoing assessments results in failing the assessment with respect to these digital signature criteria.

Figure 21:
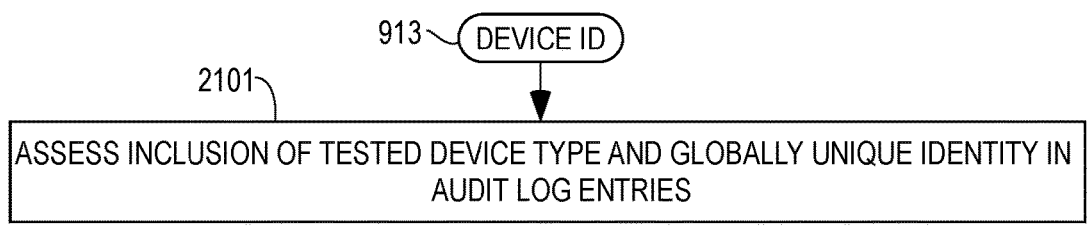
FIG. 21 comprises a flow diagram as configured in accordance with various embodiments of these teachings.

Referring now to FIG. 21, assessing the IoT device 101 with respect to its device identifier (ID) will be described. Generally speaking, these activities are looking to confirm that the device 101 can identify itself with an IoT device type and a globally unique IoT device identity. In this illustrative example, the assessment does not require the use of a particular approach regarding how a manufacturer assigns an IoT device type or a globally unique IoT device identity.

At block 2101, the process provides for performing actions that will create audit log entries (based upon the aforementioned IoT device documentation 107) and then viewing the local audit log. The process assesses whether expected audit log entries contain both the IoT device type and globally unique IoT device identity. When true, the device 101 passes this assessment. Otherwise, the device 101 fails.

The foregoing tests and assessments constitute and complete the category 2 certification tests per this illustrative example. Category 3 presumes first that the IoT device 101 has passed all of the tests/assessments of category 1 and category 2. Category 3 tests/assessments then proceed to further assess the IoT device 101 with respect to both expanded and additional criteria.

Figure 22:
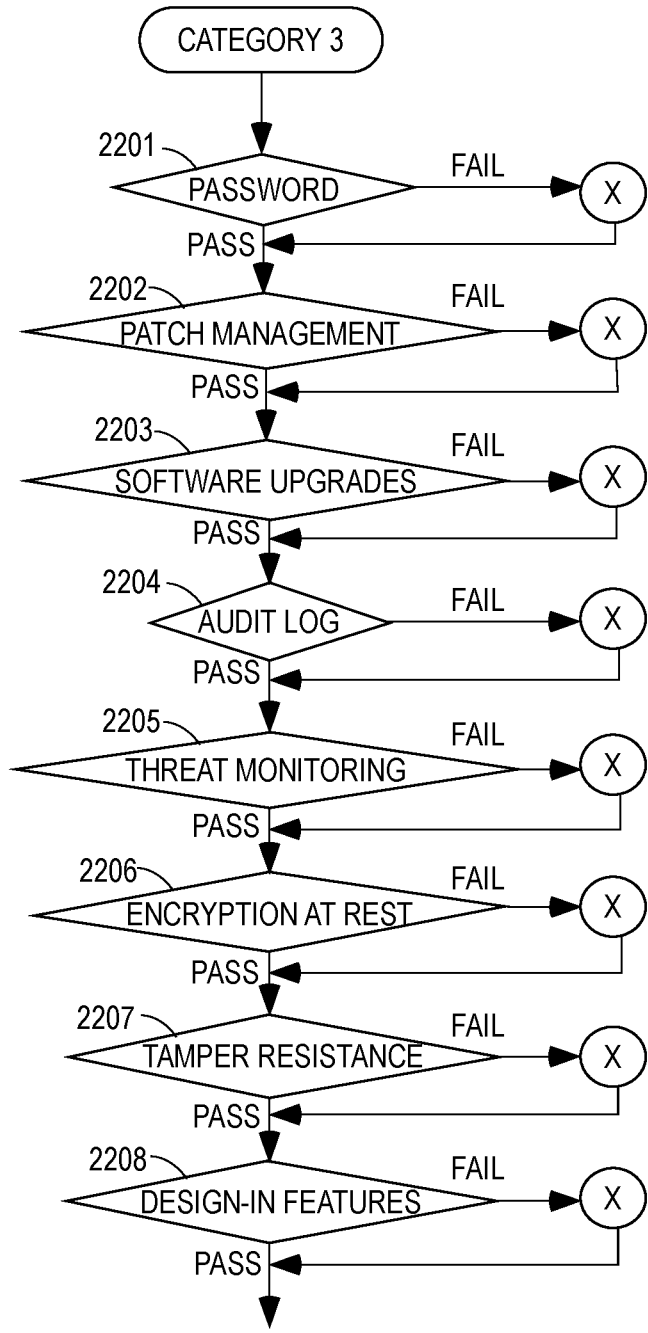
FIG. 22 comprises a flow diagram as configured in accordance with various embodiments of these teachings.

Referring now to FIG. 22, category 3 testing specifically provides for assessing, at block 2201, certain password management practices, at block 2202, certain patch management practices, at block 2203, certain software upgrades practices, at block 2204, certain audit log practices, at block 2205, certain threat monitoring practices, at block 2206, certain encryption at rest practices, at block 2207, certain tamper-resistant attributes, and at block 2208, certain design-in features. Once again, at each of the aforementioned blocks the IoT device 101 is tested/assessed with respect to one or more corresponding criteria. Failing any such test/assessment results in failing to pass that particular set of criteria. A corresponding record can be maintained by the aforementioned control circuit 102 and/or one or more human operators. Each of these assessments will now be described in more detail.

Figure 23:
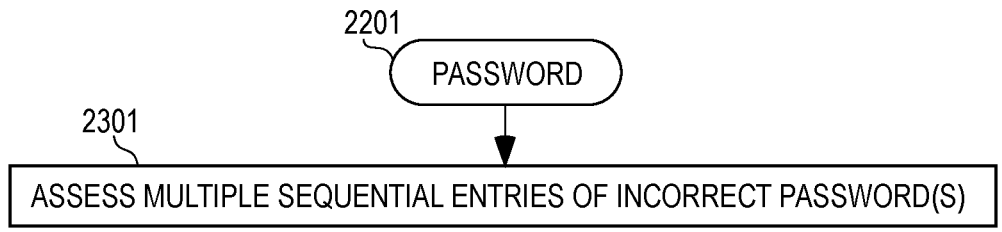
FIG. 23 comprises a flow diagram as configured in accordance with various embodiments of these teachings.

Referring now to FIG. 23, assessing the IoT device 101 with further respect to its password practices will be described. Generally speaking, these assessments are looking to further confirm that the device 101 can be integrated with an enterprise account management system.

At block 2301, and presuming the device 101 has been integrated with an enterprise account management system, the process assesses whether the device 101 will impose a rate-limiting mechanism that limits the number of unsuccessful authentication attempts. In particular, the process provides for attempting to login with an incorrect password over and over again for at least a predetermined number of times. The number of times can be designated by the user and may accord, for example, with a number of times that are designated by the enterprise management system itself. If the device 101 in fact imposes a rate-limiting mechanism per the foregoing, the device 101 passes this assessment. Otherwise, the device 101 fails.

Figure 24:
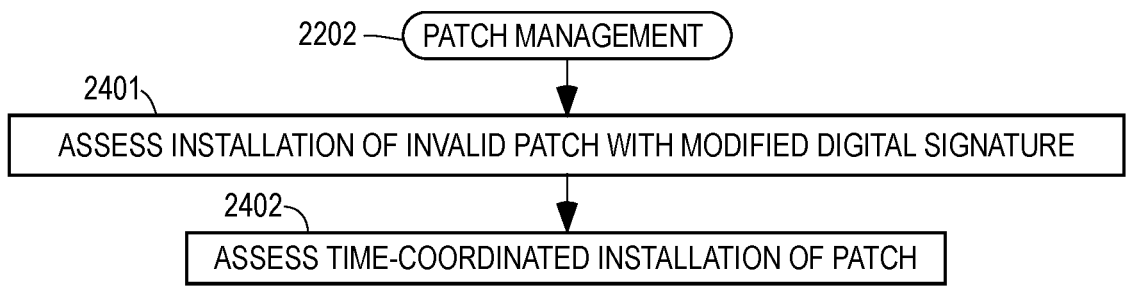
FIG. 24 comprises a flow diagram as configured in accordance with various embodiments of these teachings.

Referring now to FIG. 24, assessing the IoT device 101 further with respect to its patch management behaviors will be described. Generally speaking, these activities are looking to confirm that the device 101 supports automatic installation of digitally signed software patches from an authorized source in order to correct software problems and fix vulnerabilities at a time that is coordinated with an enterprise management system.

At block 2401, the process determines the current device software version and patch level and then locates a patch that is suitable for installation. The process then provides for modifying a copy of that patch by altering its digital signature, thereby creating an invalid patch. The process then assesses whether the device 101 will install that invalid patch accompanied by the modified digital signature. If so, the device 101 fails this assessment. Otherwise, the device 101 passes.

At block 2402, in the absence of any user login, the process assesses whether the device 101 observes that a software patch is available, and then downloads that patch and checks that the patch is unmodified from an authorized source, and then at a time coordinated with the enterprise management system installs the software patch. If the software patch is installed per the foregoing, the device 101 passes the assessment. Otherwise, the device 101 fails.

A failure to pass any of the foregoing assessments results in failing the assessment with respect to these digital signature criteria.

Figure 25:
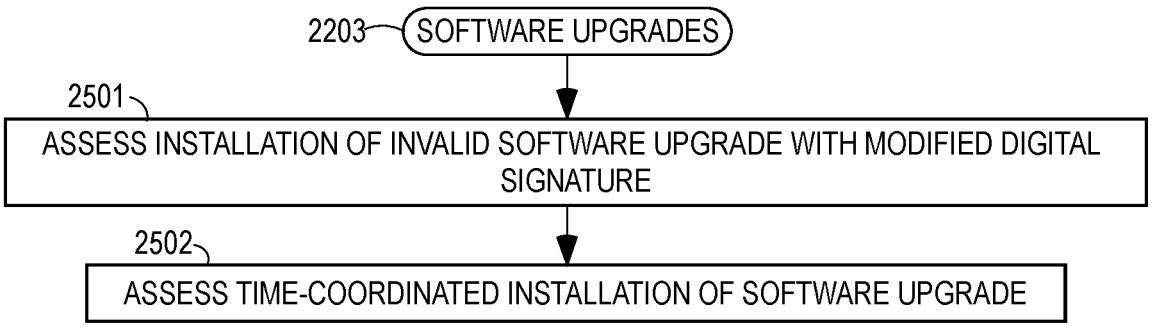
FIG. 25 comprises a flow diagram as configured in accordance with various embodiments of these teachings.

Referring now to FIG. 25, assessing the IoT device 101 with further respect to software upgrade practice will be described. Generally speaking, these activities are looking to confirm that the device 101 supports automatic installation of digitally signed software upgrades from an authorized source in order to migrate to a newer version at a time that is coordinated with an enterprise management system. These assessments presume identifying (based upon the current device software version and patch level) a software upgrade that is suitable for installation and then modifying a copy of the software upgrade by altering its digital signature to thereby create an invalid software upgrade.

At block 2501, this process provides for attempting to install the invalid software upgrade with the modified digital signature. The process then assesses whether the software upgrade is successfully installed. If true, the device 101 fails this assessment. Otherwise, the device 101 passes.

And at block 2502, and without any user login, the process provides for assessing whether the device will observe that a software upgrade is available, download it, check that the software upgrade is unmodified from an authorized source, and then at a time coordinated with the enterprise management system install that software upgrade. If the device 101 installs this software upgrade per the foregoing, the device 101 passes this assessment. Otherwise, the device 101 fails.

A failure to pass any of the foregoing assessments results in failing the assessment with respect to these software upgrade criteria.

Figure 26:
FIG. 26 comprises a flow diagram as configured in accordance with various embodiments of these teachings.

Referring now to FIG. 26, assessing the IoT device 101 with further respect to its audit log behavior will be described. Generally speaking, these activities are looking to confirm that the device 101 supports the gathering of audit log events and reporting them to an enterprise management system with a severity-based deadline. This assessment presumes that delivery deadlines for emergency, alert, critical, and error events are configured.

At block 2601, the process provides for performing actions that will create emergency, alert, critical, and audit log entries. The process then uses the network traffic monitor 103 to observe the network traffic between the device and the enterprise management system. If a DTLS-protected session is used to transfer the corresponding audit log entries before the configured deadlines are transferred in SySLog format, the device 101 passes this assessment. Otherwise, the device 101 fails.

Figure 27:
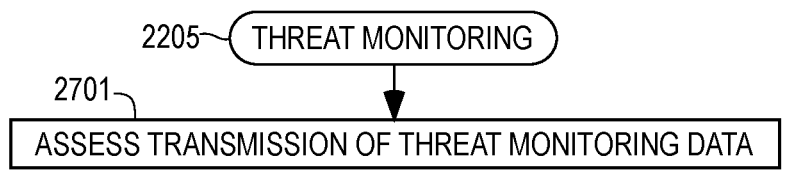
FIG. 27 comprises a flow diagram as configured in accordance with various embodiments of the invention.

Referring now to FIG. 27, assessing the IoT device 101 with respect to its threat monitoring behavior will be described. Generally speaking, these activities are looking to confirm that the device 101 supports threat monitoring integration with an enterprise cyber security management system. This assessment presumes the obtainment of device documentation regarding the configuration of the host-based security agent and configuration of the device 101 to provide asset management and threat monitoring data to the enterprise cyber security management system.

At block 2701, this process instigates actions that will trigger the configured device 101 to send asset management and threat monitoring data to the enterprise cyber security management system. The process then provides for viewing the local audit log and assessing whether the expected audit log entries are present in the audit log. If true, the device 101 passes this assessment. Otherwise, the device 101 fails.

Figure 28:
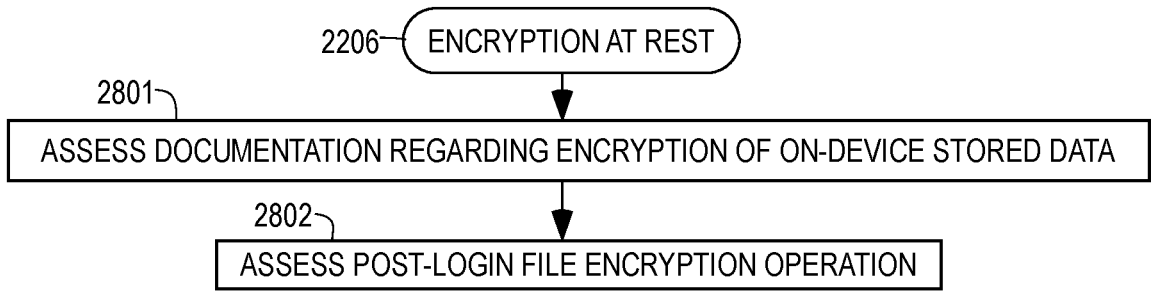
FIG. 28 comprises a flow diagram as configured in accordance with various embodiments of these teachings.

Referring now to FIG. 28, assessing the IoT device 101 with respect to encryption at rest capabilities will be described. Generally speaking, these activities are looking to confirm that the device 101 includes an effective mechanism for encrypting data that is stored in the device 101 itself.

At block 2801, this assessment presumes that the IoT device documentation 107 includes information regarding encryption of sensitive data stored in the device. If the device 101 supports encryption of files with 128-bit AES, the device 101 passes this assessment. Otherwise, the device 101 fails (even if other encryption algorithms are supported).

At block 2802, the process provides for logging in as a user with sufficient privilege and then configuring the device 101 to use the encrypting file system or file encryption mechanism to protect files with 128-bit AES. If the device 101 operates normally in these regards, the device 101 passes this assessment. Otherwise, the device 101 fails.

A failure to pass any of the foregoing assessments results in failing the assessment with respect to these encryption at rest criteria.

Figure 29:
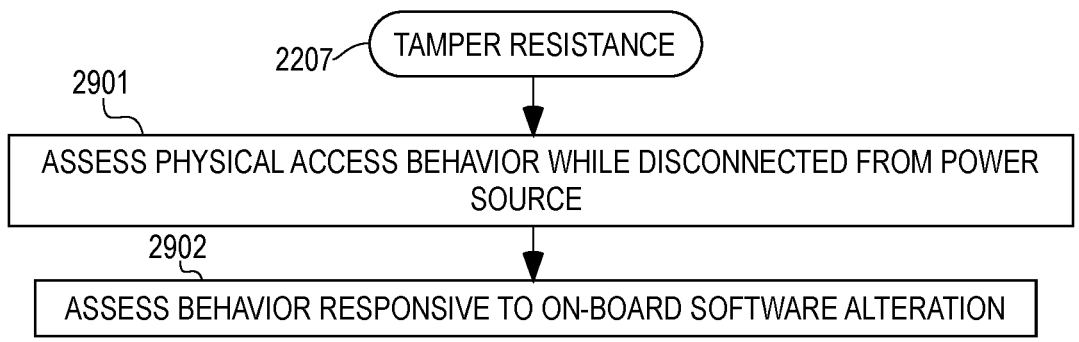
FIG. 29 comprises a flow diagram as configured in accordance with various embodiments of the invention.

Referring now to FIG. 29, assessing the IoT device 101 with respect to tamper resistance will be described. Generally speaking, these activities are looking to confirm that the device 101 has an ability to alert an enterprise monitoring system when it is physically opened or its software is altered.

At block 2901, this process provides for physically opening the device 101 while the device is disconnected from any external power source. This attempt may employ any of a variety of physical tools 108 and may accommodate one or more different tools and/or approaches to opening the device 101. By one approach the assessment is limited to nondestructive opening of the device 101 or, if desired, the assessment may include opening the device 101 in a way that destroys at least to some extent the external housing of the device 101. The process then monitors via the network traffic monitor 103 whether the device 101 sends an alert to the enterprise monitoring system. When true, the device 101 passes the assessment. Otherwise, the device 101 fails.

At block 2902, the process provides for attempting to alter the device software. This attempt shall not be one using an authorized protocol to patch or upgrade the resident software in device 101. If the device 101 sends an alert to the enterprise monitoring system, the device 101 passes this assessment. Otherwise, the device 101 fails.

A failure to pass any of the foregoing assessments results in failing the assessment with respect to these tamper resistance criteria.

Figure 30:
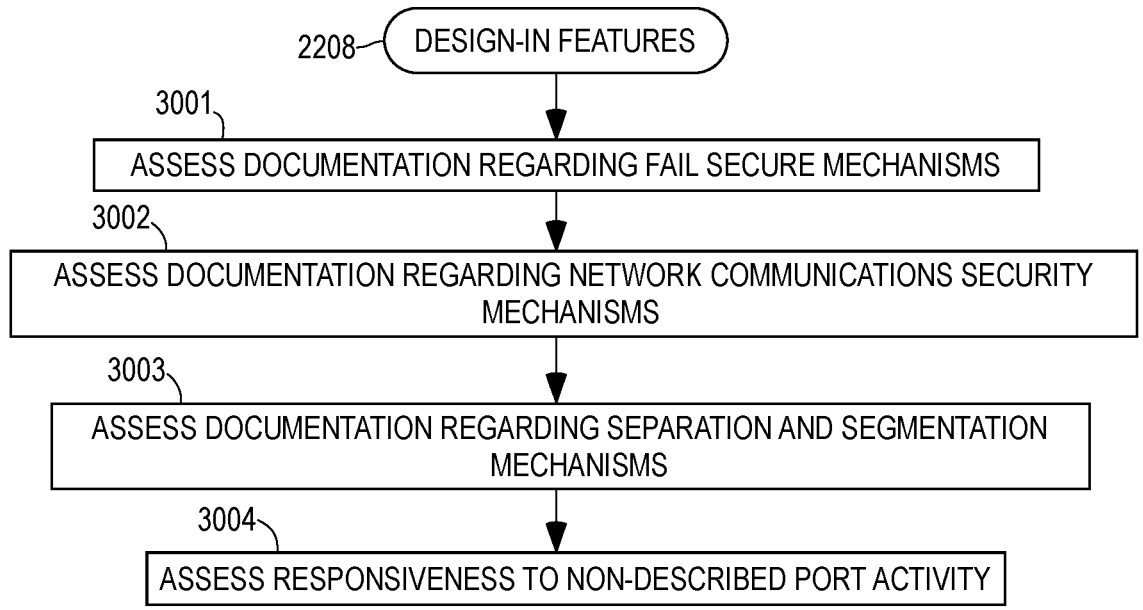
FIG. 30 comprises a flow diagram as configured in accordance with various embodiments of these teachings.

Referring now to FIG. 30, assessing the IoT device 101 with respect to its design-in features will be described. Generally speaking, these activities are looking to confirm that the security design of the device 101 includes features to fail secure, provide boundary security, and ensure function isolation.

At block 3001, the process references the aforementioned IoT device documentation 107 to determine whether the device 101 is designed to fail secure. If true, the device 101 passes this assessment. Otherwise, the device 101 fails.

At block 3002, the process references the aforementioned IoT device documentation 107 and in particular information describing the network communications security mechanisms of the device 101. If the documentation represents that the device is designed to deny all inbound and outbound network communications except those that are essential for the device to operate properly, the device 101 passes this assessment. Otherwise, the device 101 fails.

At block 3003, the process again references the aforementioned IoT device documentation 107 and in particular information describing the separation and segmentation mechanisms of the device 101. If this information represents that the device is designed to isolate critical functions from less critical functions, then the device 101 passes this assessment. Otherwise, the device 101 fails.

And, at block 3004, the process provides for trying to connect the device 101 from an external host using each TCP and UDP port. The process then assesses whether the device responds on any TCP or UDP port that is not described in the IoT device documentation 107. If the device 101 does so respond, the device 101 fails this assessment. Otherwise, the device 101 passes.

A failure to pass any of the foregoing assessments results in failing the assessment with respect to these design-in features criteria.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method for certifying Internet-of-things (IoT) devices with respect to cyber security criteria, comprising:
    providing an IoT device testing platform comprising, at least in part, a network traffic monitor and an enterprise management system;
    using the IoT device testing platform to test a candidate IoT device with respect to a first plurality of cyber security criteria and granting a first certificate for the candidate IoT device when the candidate IoT device favorably passes assessment with respect to the first plurality of cyber security criteria;
    subsequent to granting the first certificate, using the IoT device testing platform to test the candidate IoT device with respect to a second plurality of cyber security criteria and granting a second certificate for the candidate IoT device when the candidate IoT device favorably passes assessment with respect to the second plurality of cyber security criteria; and
    subsequent to granting the second certificate, using the IoT device testing platform to test the candidate IoT device with respect to a third plurality of cyber security criteria and granting a third certificate for the candidate IoT device when the candidate IoT device favorably passes assessment with respect to the third plurality of cyber security criteria.

2. The method of claim 1 wherein the first plurality of cyber security criteria include criteria specifying contents of official documentation for the candidate IoT device.

3. The method of claim 2 wherein the criteria specifying contents of official documentation for the candidate IoT device includes at least one criterion specifying content comprising terms of service and a privacy policy for the candidate IoT device.

4. The method of claim 2 wherein the first plurality of cyber security criteria further include criteria specifying specific password management requirements, specific user authentication requirements, specific patch management requirements, and specific software upgrade management requirements.

5. The method of claim 4 wherein the second plurality of cyber security criteria include criteria directed to cyber security performance when the candidate IoT device operates in a managed network.

6. The method of claim 5 wherein the second plurality of cyber security criteria include criteria specifying specific password management requirements that are not included in the first plurality of cyber security criteria.

7. The method of claim 6 wherein the criteria specifying specific password management requirements that are not included in the first plurality of cyber security criteria include at least one criterion directed to cyber security performance when the candidate IoT device operates in the managed network.

8. The method of claim 6 wherein the second plurality of cyber security criteria include categorical assessment criteria that are not addressed in the first plurality of cyber security criteria.

9. The method of claim 8 wherein the categorical assessment criteria that are not addressed in the first plurality of cyber security criteria include assessment criteria for audit log performance, multi-factor authentication, and remote deactivation.

10. The method of claim 9 wherein the categorical assessment criteria that are not addressed in the first plurality of cyber security criteria further include assessment criteria for secure boot performance, threat monitoring, digital signature handling, and device identifier handling.

11. The method of claim 8 wherein the third plurality of cyber security criteria include criteria specifying specific password management requirements that are not included in either of the first plurality of cyber security criteria or the second plurality of cyber security criteria.

12. The method of claim 11 wherein the third plurality of cyber security criteria further include criteria specifying specific patch management requirements and specific software upgrade requirements that are not included in either of the first plurality of cyber security criteria or the second plurality of cyber security criteria.

13. The method of claim 12 wherein the third plurality of cyber security criteria include additional categorical assessment criteria that are not addressed in either of the first plurality of cyber security criteria or the second plurality of cyber security criteria.

14. The method of claim 13 wherein the additional categorical assessment criteria that are not addressed in either of the first plurality of cyber security criteria or the second plurality of cyber security criteria include at least one assessment criterion for encryption at rest capabilities.

15. The method of claim 14 wherein the additional categorical assessment criteria that are not addressed in either of the first plurality of cyber security criteria or the second plurality of cyber security criteria include at least one assessment criterion for tamper resistance.

16. The method of claim 15 wherein the at least one assessment criterion for tamper resistance comprises, at least in part, a requirement for behavior of the candidate IoT device upon physically opening a housing of the candidate IoT device.

* * * * *